US012750772B2

(12) United States Patent
Abedini et al.

(10) Patent No.: US 12,750,772 B2
(45) Date of Patent: Sep. 29, 2026

(54) CELL SELECTION IN ENERGY SAVING MODE CELLS

(71) Applicant: QUALCOMM Incorporated, San Diego, CA (US)

(72) Inventors: Navid Abedini, Basking Ridge, NJ (US); Naeem Akl, Bridgewater, NJ (US); Jianghong Luo, Skillman, NJ (US); Tao Luo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 514 days.

(21) Appl. No.: 18/306,388

(22) Filed: Apr. 25, 2023

(65) Prior Publication Data

US 2023/0354184 A1 Nov. 2, 2023

Related U.S. Application Data

(60) Provisional application No. 63/336,882, filed on Apr. 29, 2022.

(51) Int. Cl.
*H04W 48/20* (2009.01)
*H04W 48/16* (2009.01)
(Continued)

(52) U.S. Cl.
CPC ........... *H04W 48/20* (2013.01); *H04W 48/16* (2013.01); *H04W 76/10* (2018.02); *H04W 76/25* (2018.02)

(58) Field of Classification Search
CPC ..... H04W 52/02; H04W 48/16; H04W 48/20; H04W 76/10; H04W 76/25; H04W 52/0206; H04W 56/0015
See application file for complete search history.

(56) References Cited

U.S. PATENT DOCUMENTS

2012/0015657 A1 1/2012 Comsa et al.
2016/0255580 A1 9/2016 Onaka et al.
(Continued)

FOREIGN PATENT DOCUMENTS

WO WO-2015099495 A1 7/2015
WO WO-2022266577 A1 12/2022

OTHER PUBLICATIONS

Huawei: "Network Energy Saving Techniques", 3GPP TSG-RAN WG3 Meeting #117bis-e, R3-225670, 3rd Generation Partnership Project (3GPP), Mobile Competence Centre, 650, Route Des Lucioles, F-06921, Sophia-Antipolis Cedex, France, vol. RAN WG3, No. E-meeting, Oct. 10, 2022-Oct. 20, 2022, Sep. 28, 2022, 10 Pages, XP052278326, Paragraphs [2 .1. 2], [02. 3], Paragraphs [2. 5 .1], [02. 6].

(Continued)

*Primary Examiner* — Diane D Mizrahi
(74) *Attorney, Agent, or Firm* — Holland & Hart LLP

(57) ABSTRACT

Methods, systems, and devices for wireless communications are described that provide for cell access procedures based on multiple types of discovery signals that may be transmitted by network entities operating in an energy saving (ES) mode. A user equipment (UE) may establish wireless connectivity via a first network entity and receive a discovery signal from a second network entity that contains less information than a synchronization signal block (SSB) for use in a cell access procedure. The UE may transmit, based at least in part on one or more conditions associated with the discovery signal being satisfied, a trigger signal to the ES-mode second network entity to transmit a SSB for use in the cell access procedure. The UE may monitor for the SSB based at least in part on the trigger signal, and perform the cell access procedure based at least in part on the SSB.

30 Claims, 18 Drawing Sheets

(51) Int. Cl.
*H04W 76/10* (2018.01)
*H04W 76/25* (2018.01)

(56) References Cited

U.S. PATENT DOCUMENTS

| | | | |
|---|---|---|---|
| 2020/0213941 A1 | 7/2020 | Mochizuki et al. | |
| 2021/0076326 A1 | 3/2021 | Akl et al. | |
| 2023/0354224 A1* | 11/2023 | Abedini | H04W 48/12 |

OTHER PUBLICATIONS

International Search Report and Written Opinion—PCT/US2023/019916—ISA/EPO—Jul. 24, 2023.

Samsung: "Network Energy Saving Techniques", 3GPP TSG RAN WG1 #110bis, R1-2209743, 3rd Generation Partnership Project (3GPP), Mobile Competence Centre, 650, Route Des Lucioles, F-06921, Sophia-Antipolis Cedex, France, vol. RAN WG1, No. e-Meeting, Oct. 10, 2022-Oct. 19, 2022, Sep. 30, 2022, 27 Pages, XP052259216, Paragraph [002.]—[03.4]—[07.2].

Samsung: "Support of SSBs for IAB Node Discovery and Measurement", 3GPP TSG RAN WG1 Ad-Hoc Meeting 1901, R1-1901043, 3rd Generation Partnership Project (3GPP), Mobile Competence Centre, 650, Route Des Lucioles, F-06921, Sophia-Antipolis Cedex, France, vol. RAN WG1, No. Taipei, Taiwan, Jan. 21, 2019-Jan. 25, 2019, Jan. 11, 2019, 6 Pages, XP051576577, Paragraph [001.]—[003.].

* cited by examiner

CELL SELECTION IN ENERGY SAVING MODE CELLS

CROSS REFERENCE

The present application for patent claims the benefit of U.S. Provisional Patent Application No. 63/336,882 by ABEDINI et al., entitled "CELL SELECTION IN ENERGY SAVING MODE CELLS," filed Apr. 29, 2022, assigned to the assignee hereof, and expressly incorporated by reference herein.

FIELD OF TECHNOLOGY

The following relates to wireless communications, including cell selection in energy saving mode cells.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless communications systems, a network entity may communicate with a UE, where the network entity and the UE may operate in one or more modes. For example, a network entity may operate in an energy saving mode in which fewer transmissions are performed in order to reduce operating power relative to operations in a non-energy saving mode. Such different modes of operation at a network entity may result in complications when monitoring for transmissions of network entities.

SUMMARY

The described techniques relate to improved methods, systems, devices, and apparatuses that support cell selection in energy saving (ES) mode cells. In particular, aspects of the present disclosure provide for cell access procedures based on multiple types of discovery signals that may be transmitted by network entities operating in an ES mode, network entities operating in a non-ES mode, or both. In particular, a user equipment (UE) may establish wireless connectivity via a first network entity and receive a discovery signal from a second network entity that contains less information than a synchronization signal block (SSB) for use in a cell access procedure. For example, the second network entity may be operating in an ES mode and may transmit a discovery signal (e.g., a keep alive signal (KAS), or reference signal) at a reduced frequency or with less information than SSB transmissions of the first network entity operating in a non-ES mode. A UE may receive such a discovery signal and perform the cell access procedure based at least in part on the discovery signal. For example, the UE may transmit, based at least in part on one or more conditions associated with the discovery signal being satisfied, a trigger signal to the ES-mode second network entity to transmit a SSB for use in the cell access procedure. In such cases, the UE may monitor for the SSB based at least in part on the trigger signal, and perform the cell access procedure (e.g., a cell selection or cell reselection procedure) based at least in part on one or more of the SSB or the discovery signal.

A method for wireless communication at a UE is described. The method may include establishing wireless connectivity via a first network entity, receiving a discovery signal from a second network entity, where the discovery signal contains less information than a SSB for use in a cell access procedure, transmitting, based on one or more conditions associated with the discovery signal being satisfied, a trigger signal to the second network entity to transmit the SSB for use in the cell access procedure, where the cell access procedure is based on signal measurements of both the first network entity and the second network entity, and monitoring for the SSB based on the trigger signal.

An apparatus for wireless communication at a UE is described. The apparatus may include a processor, memory coupled with the processor, and instructions stored in the memory. The instructions may be executable by the processor to cause the apparatus to establish wireless connectivity via a first network entity, receive a discovery signal from a second network entity, where the discovery signal contains less information than a SSB for use in a cell access procedure, transmit, based on one or more conditions associated with the discovery signal being satisfied, a trigger signal to the second network entity to transmit the SSB for use in the cell access procedure, where the cell access procedure is based on signal measurements of both the first network entity and the second network entity, and monitor for the SSB based on the trigger signal.

Another apparatus for wireless communication at a UE is described. The apparatus may include means for establishing wireless connectivity via a first network entity, means for receiving a discovery signal from a second network entity, where the discovery signal contains less information than a SSB for use in a cell access procedure, means for transmitting, based on one or more conditions associated with the discovery signal being satisfied, a trigger signal to the second network entity to transmit the SSB for use in the cell access procedure, where the cell access procedure is based on signal measurements of both the first network entity and the second network entity, and means for monitoring for the SSB based on the trigger signal.

A non-transitory computer-readable medium storing code for wireless communication at a UE is described. The code may include instructions executable by a processor to establish wireless connectivity via a first network entity, receive a discovery signal from a second network entity, where the discovery signal contains less information than a SSB for use in a cell access procedure, transmit, based on one or more conditions associated with the discovery signal being satisfied, a trigger signal to the second network entity to transmit the SSB for use in the cell access procedure, where the cell access procedure is based on signal measurements of both the first network entity and the second network entity, and monitor for the SSB based on the trigger signal.

In some examples of the method, apparatuses, and non-transitory computer-readable medium described herein, the discovery signal is a reference signal that provides less than a full cell identification associated with the second network entity. In some examples of the method, apparatuses, and non-transitory computer-readable medium described herein, the discovery signal is a keep alive signal that provides less than a full cell identification associated with the second network entity.

In some examples of the method, apparatuses, and non-transitory computer-readable medium described herein, the one or more conditions include at least one of: whether one or more of a non-blocked frequency is used for transmission of the discovery signal, whether a non-blocked cell is associated with the discovery signal, whether a signal strength of the discovery signal satisfies a first threshold, whether a number of neighbor network entities, that are detected to have a signal strength that satisfies a second threshold and a higher selection priority than the second network entity that transmits discovery signal, satisfies a third threshold, and whether a serving cell signal strength satisfies a fourth threshold.

In some examples of the method, apparatuses, and non-transitory computer-readable medium described herein, the trigger signal initiates a transmission of a CD-SSB from the second network entity. Some examples of the method, apparatuses, and non-transitory computer-readable medium described herein may further include operations, features, means, or instructions for receiving information that includes at least a portion of the one or more conditions. In some examples of the method, apparatuses, and non-transitory computer-readable medium described herein, the information may be received in system information, in radio resource control (RRC) signaling, in a medium access control (MAC) control element (CE), or any combinations thereof.

In some examples of the method, apparatuses, and non-transitory computer-readable medium described herein, at least one of the one or more conditions is defined for triggering the second network entity operating in an energy-saving mode to transmit the SSB for use in the cell access procedure. Some examples of the method, apparatuses, and non-transitory computer-readable medium described herein may further include operations, features, means, or instructions for starting a timer for transmitting the trigger signal responsive to the one or more conditions being satisfied, and where the transmitting the trigger signal is based on the one or more conditions being satisfied for a duration of the timer.

In some examples of the method, apparatuses, and non-transitory computer-readable medium described herein, the one or more conditions include at least one of: whether a signal strength or quality of a serving cell, a signal strength or quality of the discovery signal, or both, satisfies a first threshold, whether a frequency of the discovery signal and a priority associated with the frequency exceeds a priority of a serving cell, whether a signal strength or quality of at least a first neighboring network entity operating on a non-energy-saving mode satisfies a second threshold, whether a signal strength or quality of at least a second neighboring network entity operating on an energy-saving mode satisfies a third threshold, whether a first number of detected network entities operating in the non-energy-saving mode exceeds a second number of detected network entities operating in the energy-saving mode, for two or more different frequencies, whether a barred or reserved channel access status is detected for one or more of the second network entity, the first neighboring network entity, or the second neighboring network entity, and whether one or more thresholds for one or more measured parameters is satisfied for a timer duration associated with the one or more thresholds. In some examples of the method, apparatuses, and non-transitory computer-readable medium described herein, the one or more conditions are cell-specific conditions for a cell associated with the second network entity, frequency-specific conditions for a frequency associated with the discovery signal, beam-specific conditions for a beam associated with a cell of the second network entity, or any combinations thereof.

A method for wireless communication at a UE is described. The method may include receiving configuration information for a first type of signaling for use in a cell access procedure for cells operating in a first energy mode and a second type of signaling for use in the cell access procedure for a cell operating in a second energy mode that uses less energy than the first energy mode, where the first type of signaling includes a SSB transmitted on a first synchronization raster that has associated system information for the cell access procedure, and where the second type of signaling includes one or more of a measurement reference signal, a SSB transmitted on a different synchronization raster than the first synchronization raster, or a SSB transmitted without the associated system information, receiving at least one instance of the second type of signaling, and performing a cell access procedure with a cell based on the second type of signaling.

An apparatus for wireless communication at a UE is described. The apparatus may include a processor, memory coupled with the processor, and instructions stored in the memory. The instructions may be executable by the processor to cause the apparatus to receive configuration information for a first type of signaling for use in a cell access procedure for cells operating in a first energy mode and a second type of signaling for use in the cell access procedure for a cell operating in a second energy mode that uses less energy than the first energy mode, where the first type of signaling includes a SSB transmitted on a first synchronization raster that has associated system information for the cell access procedure, and where the second type of signaling includes one or more of a measurement reference signal, a SSB transmitted on a different synchronization raster than the first synchronization raster, or a SSB transmitted without the associated system information, receive at least one instance of the second type of signaling, and perform a cell access procedure with a cell based on the second type of signaling.

Another apparatus for wireless communication at a UE is described. The apparatus may include means for receiving configuration information for a first type of signaling for use in a cell access procedure for cells operating in a first energy mode and a second type of signaling for use in the cell access procedure for a cell operating in a second energy mode that uses less energy than the first energy mode, where the first type of signaling includes a SSB transmitted on a first synchronization raster that has associated system information for the cell access procedure, and where the second type of signaling includes one or more of a measurement reference signal, a SSB transmitted on a different synchronization raster than the first synchronization raster, or a SSB transmitted without the associated system information, means for receiving at least one instance of the second type of signaling, and means for performing a cell access procedure with a cell based on the second type of signaling.

A non-transitory computer-readable medium storing code for wireless communication at a UE is described. The code may include instructions executable by a processor to receive configuration information for a first type of signaling for use in a cell access procedure for cells operating in a first energy mode and a second type of signaling for use in the cell access procedure for a cell operating in a second energy mode that uses less energy than the first energy mode, where the first type of signaling includes a SSB transmitted on a first synchronization raster that has associated system information for the cell access procedure, and where the second type of signaling includes one or more of a measurement reference signal, a SSB transmitted on a different synchronization raster than the first synchronization raster, or a SSB transmitted without the associated system information, receive at least one instance of the second type of signaling, and perform a cell access procedure with a cell based on the second type of signaling.

In some examples of the method, apparatuses, and non-transitory computer-readable medium described herein, the first type of signaling provides a CD-SSB transmitted on the first synchronization raster that has an associated RMSI transmission and the second type of signaling is a non-CD-SSB. In some examples of the method, apparatuses, and non-transitory computer-readable medium described herein, the second type of signaling is an SSB transmitted on a frequency that is off the first synchronization raster associated with CD-SSBs.

In some examples of the method, apparatuses, and non-transitory computer-readable medium described herein, the second type of signaling is a partial-CD-SSB that has the associated RMSI transmitted in fewer than all instances of SSB s, transmitted on fewer than all beam directions, or transmitted based on a trigger signal from the UE. In some examples of the method, apparatuses, and non-transitory computer-readable medium described herein, the second type of signaling is a channel state information (CSI) reference signal. In some examples of the method, apparatuses, and non-transitory computer-readable medium described herein, the configuration information is provided in a system information block, dedicated signaling, radio resource control signaling, a provisioned list of an operator associated with the UE, or any combinations thereof. In some examples of the method, apparatuses, and non-transitory computer-readable medium described herein, the second type of signaling is defined for cells operating in the second energy mode.

A method for wireless communication at a network entity is described. The method may include transmitting a discovery signal while operating in an energy-saving mode, where the discovery signal contains less information than a SSB for use in a cell access procedure, receiving, from a UE based on the discovery signal, a trigger signal that indicates a SSB for use in the cell access procedure is to be transmitted, and transmitting the SSB based on the trigger signal.

An apparatus for wireless communication at a network entity is described. The apparatus may include a processor, memory coupled with the processor, and instructions stored in the memory. The instructions may be executable by the processor to cause the apparatus to transmit a discovery signal while operating in an energy-saving mode, where the discovery signal contains less information than a SSB for use in a cell access procedure, receive, from a UE based on the discovery signal, a trigger signal that indicates a SSB for use in the cell access procedure is to be transmitted, and transmit the SSB based on the trigger signal.

Another apparatus for wireless communication at a network entity is described. The apparatus may include means for transmitting a discovery signal while operating in an energy-saving mode, where the discovery signal contains less information than a SSB for use in a cell access procedure, means for receiving, from a UE based on the discovery signal, a trigger signal that indicates a SSB for use in the cell access procedure is to be transmitted, and means for transmitting the SSB based on the trigger signal.

A non-transitory computer-readable medium storing code for wireless communication at a network entity is described. The code may include instructions executable by a processor to transmit a discovery signal while operating in an energy-saving mode, where the discovery signal contains less information than a SSB for use in a cell access procedure, receive, from a UE based on the discovery signal, a trigger signal that indicates a SSB for use in the cell access procedure is to be transmitted, and transmit the SSB based on the trigger signal.

In some examples of the method, apparatuses, and non-transitory computer-readable medium described herein, the discovery signal is a reference signal provides less than a full cell identification associated with the network entity. In some examples of the method, apparatuses, and non-transitory computer-readable medium described herein, the discovery signal is a keep alive signal that provides less than a full cell identification associated with the network entity.

In some examples of the method, apparatuses, and non-transitory computer-readable medium described herein, the UE is configured with one or more conditions for transmitting the trigger signal, and where the one or more conditions include at least one of: whether one or more of a non-blocked frequency is used for transmission of the discovery signal, whether a non-blocked cell is associated with the discovery signal, whether a signal strength of the discovery signal satisfies a first threshold, whether a number of neighbor network entities, that are detected to have a signal strength that satisfies a second threshold and a higher selection priority than the network entity that transmits discovery signal, satisfies a third threshold, and whether a serving cell signal strength satisfies a fourth threshold.

In some examples of the method, apparatuses, and non-transitory computer-readable medium described herein, the SSB is a CD-SSB transmitted on a defined synchronization raster frequency and having an associated remaining minimum remaining system information transmission. Some examples of the method, apparatuses, and non-transitory computer-readable medium described herein may further include operations, features, means, or instructions for transmitting configuration information to the UE that includes one or more conditions that are to be satisfied prior to transmitting the trigger signal. In some examples of the method, apparatuses, and non-transitory computer-readable medium described herein, the configuration information is transmitted in system information, in RRC signaling, in a MAC-CE, or any combinations thereof.

In some examples of the method, apparatuses, and non-transitory computer-readable medium described herein, at least one of the one or more conditions is defined for triggering the network entity operating in the energy-saving mode to transmit the SSB for use in the cell access procedure. In some examples of the method, apparatuses, and non-transitory computer-readable medium described herein, the configuration information includes a timer value associated with the trigger signal and the trigger signal is transmitted based on at least one of the one or more conditions being satisfied for a duration of the timer value.

In some examples of the method, apparatuses, and non-transitory computer-readable medium described herein, the one or more conditions include at least one of: whether a signal strength or quality of a serving cell, a signal strength or quality of the discovery signal, or both, satisfies a first threshold, whether a frequency of the discovery signal and a priority associated with the frequency exceeds a priority of a serving cell, whether a signal strength or quality of at least a first neighboring network entity operating on a non-energy-saving mode satisfies a second threshold, whether a signal strength or quality of at least a second neighboring network entity operating on the energy-saving mode satisfies a third threshold, whether a first number of detected network entities operating in the non-energy-saving mode exceeds a second number of detected network entities operating in the energy-saving mode, for two or more different frequencies, whether a barred or reserved channel access status is detected for one or more of the network entity, the first neighboring network entity, or the second neighboring network entity, and whether one or more thresholds for one or more measured parameters is satisfied for a timer duration associated with the one or more thresholds. In some examples of the method, apparatuses, and non-transitory computer-readable medium described herein, the one or more conditions are cell-specific conditions for a cell associated with the network entity, frequency-specific conditions for a frequency associated with the discovery signal, beam-specific conditions for a beam associated with a cell of the network entity, or any combinations thereof.

A method for wireless communication at a network entity is described. The method may include transmitting configuration information to a UE for a first type of signaling for use in a cell access procedure for cells operating in a first energy mode and a second type of signaling for use in the cell access procedure for a cell operating in a second energy mode that uses less energy than the first energy mode, where the first type of signaling includes a SSB transmitted on a first synchronization raster that has associated system information for the cell access procedure, and where the second type of signaling includes one or more of a measurement reference signal, a SSB transmitted on a different synchronization raster than the first synchronization raster, or a SSB transmitted without the associated system information, receiving, from the UE, an indication of a cell that is operating in the second energy mode as part of the cell access procedure, and performing the cell access procedure based on the indication from the UE.

An apparatus for wireless communication at a network entity is described. The apparatus may include a processor, memory coupled with the processor, and instructions stored in the memory. The instructions may be executable by the processor to cause the apparatus to transmit configuration information to a UE for a first type of signaling for use in a cell access procedure for cells operating in a first energy mode and a second type of signaling for use in the cell access procedure for a cell operating in a second energy mode that uses less energy than the first energy mode, where the first type of signaling includes a SSB transmitted on a first synchronization raster that has associated system information for the cell access procedure, and where the second type of signaling includes one or more of a measurement reference signal, a SSB transmitted on a different synchronization raster than the first synchronization raster, or a SSB transmitted without the associated system information, receive, from the UE, an indication of a cell that is operating in the second energy mode as part of the cell access procedure, and perform the cell access procedure based on the indication from the UE.

Another apparatus for wireless communication at a network entity is described. The apparatus may include means for transmitting configuration information to a UE for a first type of signaling for use in a cell access procedure for cells operating in a first energy mode and a second type of signaling for use in the cell access procedure for a cell operating in a second energy mode that uses less energy than the first energy mode, where the first type of signaling includes a SSB transmitted on a first synchronization raster that has associated system information for the cell access procedure, and where the second type of signaling includes one or more of a measurement reference signal, a SSB transmitted on a different synchronization raster than the first synchronization raster, or a SSB transmitted without the associated system information, means for receiving, from the UE, an indication of a cell that is operating in the second energy mode as part of the cell access procedure, and means for performing the cell access procedure based on the indication from the UE.

A non-transitory computer-readable medium storing code for wireless communication at a network entity is described. The code may include instructions executable by a processor to transmit configuration information to a UE for a first type of signaling for use in a cell access procedure for cells operating in a first energy mode and a second type of signaling for use in the cell access procedure for a cell operating in a second energy mode that uses less energy than the first energy mode, where the first type of signaling includes a SSB transmitted on a first synchronization raster that has associated system information for the cell access procedure, and where the second type of signaling includes one or more of a measurement reference signal, a SSB transmitted on a different synchronization raster than the first synchronization raster, or a SSB transmitted without the associated system information, receive, from the UE, an indication of a cell that is operating in the second energy mode as part of the cell access procedure, and perform the cell access procedure based on the indication from the UE.

In some examples of the method, apparatuses, and non-transitory computer-readable medium described herein, the first type of signaling provides a CD-SSB transmitted on the first synchronization raster that has an associated RMSI transmission and the second type of signaling is a non-CD-SSB. In some examples of the method, apparatuses, and non-transitory computer-readable medium described herein, the second type of signaling is an SSB transmitted on a frequency that is off the first synchronization raster associated with CD-SSBs. In some examples of the method, apparatuses, and non-transitory computer-readable medium described herein, the second type of signaling is a partial-CD-SSB that has the associated RMSI transmitted in fewer than all instances of SSBs, transmitted on fewer than all beam directions, or transmitted based on a trigger signal from the UE. In some examples of the method, apparatuses, and non-transitory computer-readable medium described herein, the second type of signaling is a CSI reference signal. In some examples of the method, apparatuses, and non-transitory computer-readable medium described herein, the configuration information is provided in a system information block, dedicated signaling, radio resource control signaling, a provisioned list of an operator associated with the UE, or any combinations thereof. In some examples of the method, apparatuses, and non-transitory computer-readable medium described herein, the second type of signaling is defined for cells operating in the second energy mode.

DETAILED DESCRIPTION

Figure 1:
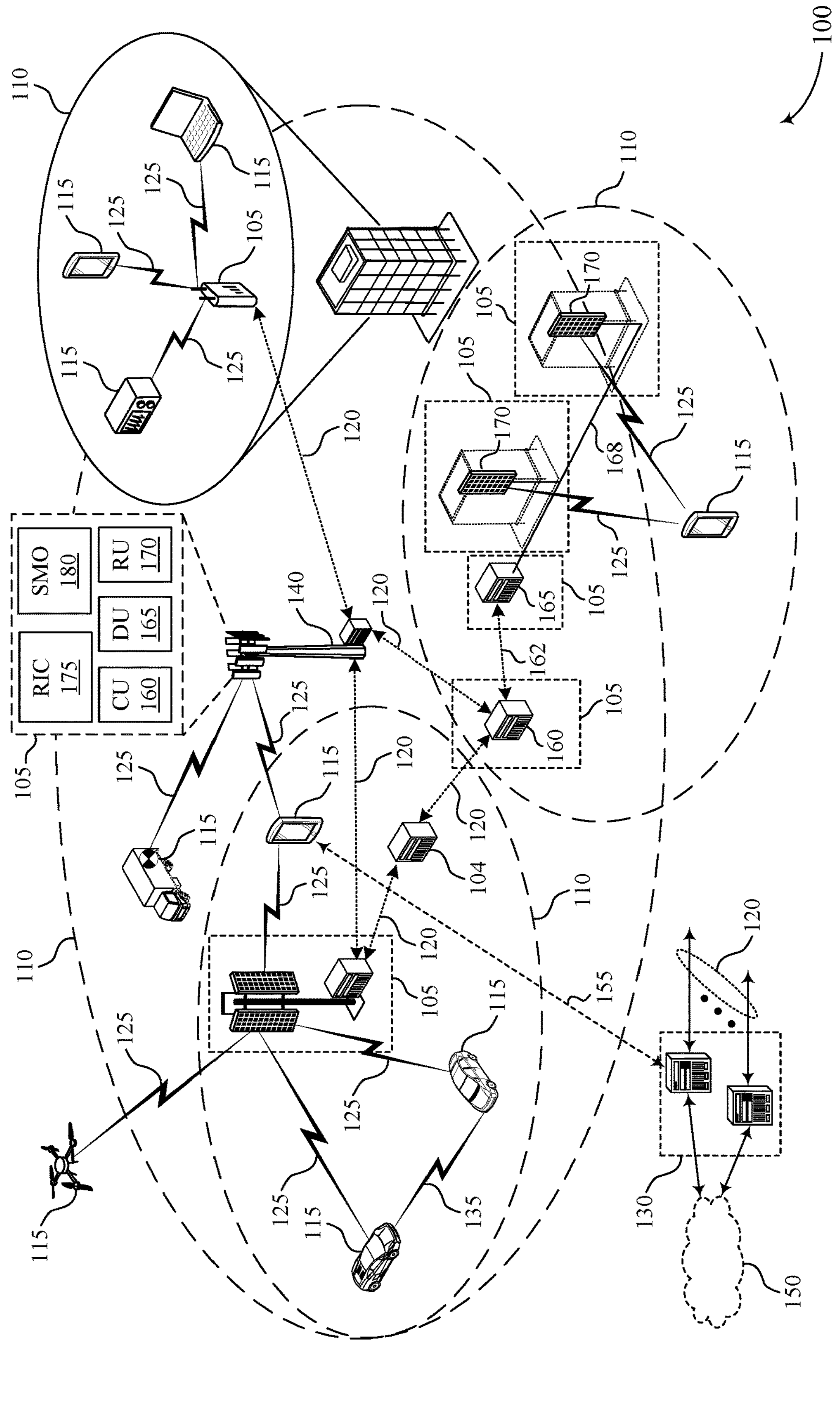
FIG. 1 illustrates an example of a wireless communications system that supports cell selection in energy saving (ES) mode cells in accordance with one or more aspects of the present disclosure.

In some wireless communications systems, a network entity may communicate with a UE, where the network entity and the UE may operate in one or more operational modes. For example, a network entity may operate in an energy saving (ES) mode in which fewer transmissions are performed in order to reduce operating power relative to operations in a non-ES mode. For example, to provide power savings at a network entity, an ES-mode network entity may provide a reduced number of synchronization signal block (SSB) transmissions than a non-ES mode network entity (e.g., SSBs may be transmitted with longer periods between SSBs in ES mode, or may be transmitted without an associated remaining minimum system information (RMSI) transmission). This may result in an ES mode network entity transmitting fewer cell-defining SSBs (CD-SSBs) than a non-ES mode network entity. Such SSB transmissions may be used by UEs for cell access procedures, such as cell selection or cell reselection procedures. As such, UEs that perform cell access procedures where some potential candidate cells are provided by a network entity in an ES mode may not identify such candidate cells for consideration in the cell access procedure. In such cases, a cell access procedure may identify a cell of a non-ES mode network entity instead of an ES mode cell that may provide more efficient communications, which may result in degraded overall efficiency and reliability of the wireless communication system.

Accordingly, aspects of the present disclosure provide techniques for cell selection in the presence of one or more cells that are operating in an ES mode, in a non-ES mode, or any combinations thereof. For example, a UE may receive a discovery signal from a network entity that contains less information than a SSB for use in a cell access procedure. The UE may transmit, based at least in part on one or more conditions associated with the discovery signal being satisfied, a trigger signal to the network entity to transmit the SSB for use in the cell access procedure, and may monitor for the SSB based at least in part on the trigger signal. Such techniques may provide for operation of network entities in an ES mode and also provide for cell access procedures that are based on signals from ES mode cells and non-ES mode cells. As such, techniques described herein may provide for efficient network operation while also reducing network power consumption. Further, by enabling the UE to trigger SSB transmissions from ES mode cells, cell access may be enhanced and provide cell selection of a suitable cell from cells operating in different modes, which may provide more efficient communications and enhanced overall efficiency and reliability of the wireless communication system.

In some implementations, additionally, or alternatively, a network entity may provide configuration information to a UE for a first type of signaling for use in a cell access procedure for cells operating in a first energy mode and a second type of signaling for use in the cell access procedure for a cell operating in a second energy mode that uses less energy than the first energy mode. In some cases, the first type of signaling includes a SSB transmitted on a first synchronization raster that has associated system information (e.g., RMSI) for a cell access procedure, and the second type of signaling includes one or more of a measurement reference signal, a SSB transmitted on a different synchronization raster than the first synchronization raster, or a synchronization signal block transmitted without the associated system information. In such cases, the UE may receive at least one instance of the second type of signaling, and perform the cell access procedure based at least in part on the second type of signaling. Such techniques may provide for operation of network entities in an ES mode that provide the second type of signaling for use in cell access procedures, and may provide for efficient network operation while also reducing network power consumption. Further, by enabling the UE to perform cell access based at least in part on the second type of signaling, cell access may be enhanced and may provide more efficient communications, and thus enhanced overall efficiency and reliability of the wireless communication system.

Aspects of the disclosure are initially described in the context of wireless communications systems. Aspects of the disclosure are further illustrated by and described with reference to a process flow, apparatus diagrams, system diagrams, and flowcharts that relate to cell selection in ES mode cells.

FIG. 1 illustrates an example of a wireless communications system 100 that supports cell selection in ES mode cells in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support cell selection in ES mode cells as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNB s or gNB s, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support concurrent communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max}\cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multipanel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

Techniques described herein may enable a UE 115 to support cell selection in ES mode cells. In some cases, a UE 115 may receive a discovery signal from a network entity 105 that contains less information than a SSB for use in a cell access procedure. For example, a network entity 105 operating in an ES mode may transmit a discovery signal (e.g., a KAS or reference signal) at a reduced frequency or with less information than SSB transmissions of another network entity 105 operating in a non-ES mode. The UE 115 may receive such a discovery signal and perform the cell access procedure based at least in part on the discovery signal. For example, the UE 115 may transmit, based at least in part on one or more conditions associated with the discovery signal being satisfied, a trigger signal to the ES-mode network entity 105 to transmit a SSB for use in the cell access procedure. In such cases, the UE 115 may monitor for the SSB based at least in part on the trigger signal, and perform the cell access procedure (e.g., a cell selection or cell reselection procedure) based at least in part on one or more of the SSB or the discovery signal. By enabling the network to perform cell access while various network entities 105 are operating in an ES mode, overall network power consumption may be reduced while also providing for efficient cell access procedures.

Figure 2:
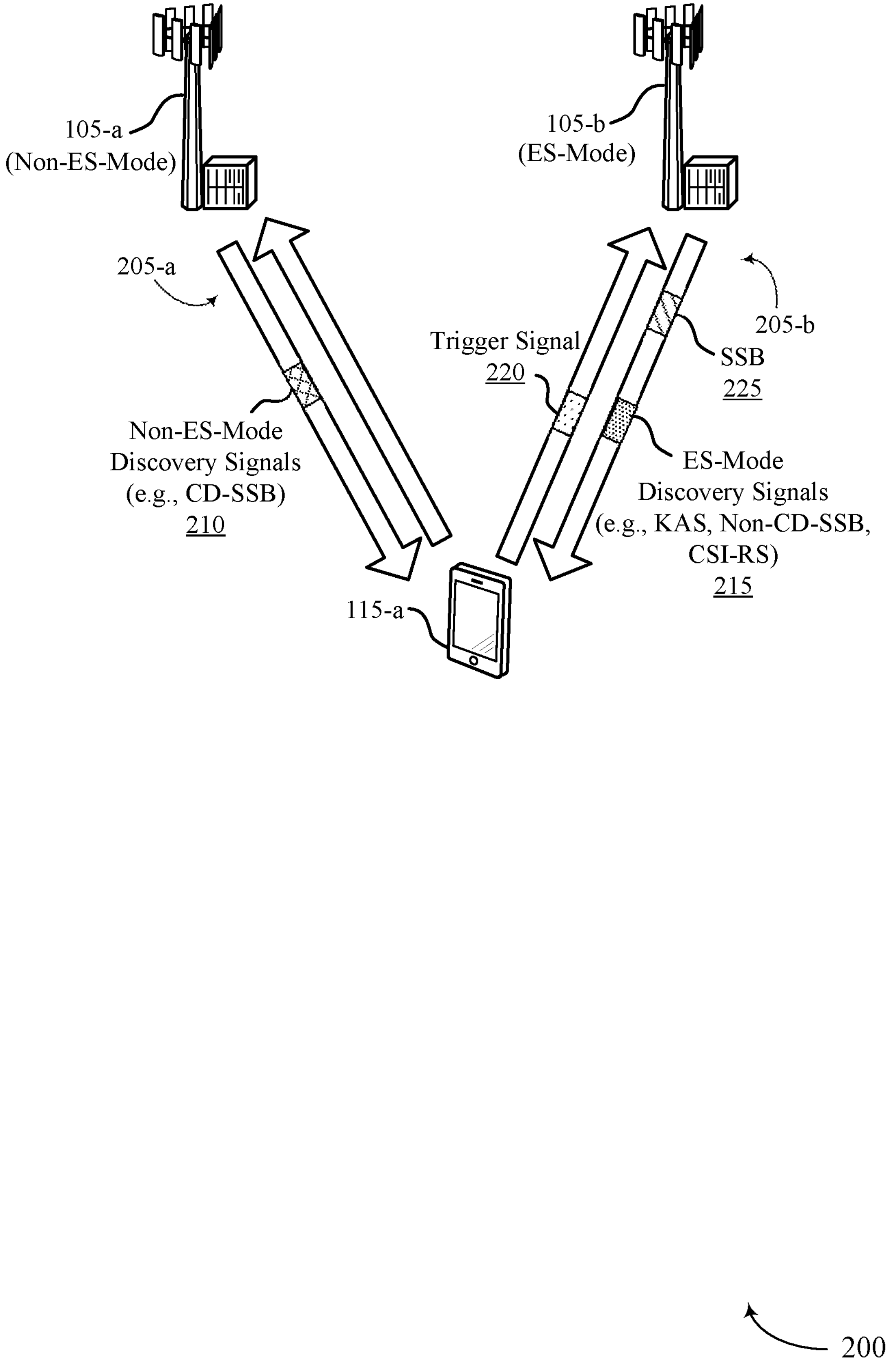
FIG. 2 illustrates another example of a wireless communications system that supports cell selection in ES mode cells in accordance with one or more aspects of the present disclosure.

FIG. 2 illustrates an example of a wireless communications system 200 that supports cell selection in ES mode cells in accordance with one or more aspects of the present disclosure. In some examples, aspects of the wireless communications system 200 may implement, or be implemented by, aspects of the wireless communications system 100.

The wireless communications system 200 may include a first network entity 105-*a*, a second network entity 105-*b*, and a UE 115-*a*, which may be examples of network entities 105 and UEs 115 as described with reference to FIG. 1. The UE 115-*a* may communicate with one or more of the network entities 105-*a*, 105-*b* using communication links 205-*a* and 205-*b*, respectively, which may be examples of NR or LTE links between the UE 115-*a* and the respective network entities 105-*a*, 105-*b*. In some cases, the communication links 205-*a*, 205-*b* between the UE 115-*a* and the network entities 105-*a*, 105-*b* may include examples of access links (e.g., Uu links) which may include bi-directional links that enable both uplink and downlink communication. For example, the UE 115-*a* may transmit uplink signals, such as uplink control signals or uplink data signals, to one or more components of the first network entity 105-*a* using the communication link 205-*a*, and one or more components of the first network entity 105-*a* may transmit downlink signals, such as downlink control signals or downlink data signals, to the UE 115-*a* using the communication link 205-*a*.

Additionally, or alternatively, the first network entity 105-*a* and the second network entity 105-*b* may be examples of first and second transmission-reception points (TRPs) associated with one or more network entities 105. For example, in some cases, the UE 115-*a* may communicate with a first TRP (e.g., TRP1) via the communication link 205-*a*, and may communicate with a second TRP (e.g., TRP2) via the communication link 205-*b*. In such cases, the first and second TRPs (e.g., TRP1, TRP2) may be associated with the same or different network entities 105.

As noted previously herein, some wireless communications systems enable network entities 105 and other devices to operate in an ES mode to reduce overall network power consumption. In the example of FIG. 2, the first network entity 105-*a* may operate in a non-ES mode (e.g., a regular power consumption mode) in which non-ES mode discovery signals 210 (e.g., CD-SSBs) are transmitted with information and periodicity as expected in a traditional cell access procedure. In this example, the second network entity 105-*b* may operate in an ES mode in which ES mode discovery signals 215 (e.g., KASs, non-CD-SSBs, channel state information reference signals (CSI-RSs)) are transmitted.

In some implementations, the second network entity 105-*b*, when operating in ES mode, may send periodic KASs as the ES mode discovery signals 215 and transmit a full SSB 225 upon receipt of a trigger signal 220 from the UE 115-*a*. In some cases, the UE 115-*a* may transmit the trigger signal 220 if one or more conditions for such a trigger are met. The SSB 225 and non-ES mode discovery signals 210 (e.g., SSBs such as CD-SSBs from the first network entity 105-*a*) may be used in a cell access procedure at the UE 115-*a*.

In accordance with various aspects, the cell access procedure may be a cell selection or reselection procedure. In some cases, cell selection or reselection may be based on SSBs (e.g., CD-SSBs) located on a synchronization raster. For a cell selection procedure, the UE 115-*a* may seek to identify a suitable cell or, if a suitable cell is not found, an acceptable cell, to camp on. A suitable cell may be a cell that: satisfies cell selection criteria; is not barred or reserved; is not part of a disallowed tracking areas for roaming; and has a cell public land mobile network (PLMN) that is a selected PLMN, a registered PLMN, or an equivalent PLMN. An acceptable cell may be a cell that satisfies the cell selection criteria and is not barred. The cell selection criteria (S) may be signal strength or quality parameters that are measured for cells, such as selection criteria (S) as defined in 3GPP TS38.304, which include:

$$0<\mathrm{Srxlev}=Q_{rxlevmeas}-(Q_{rxlevmin}{}^{*}Q_{rxlevminoffset})-P_{compensation}-Q\mathrm{offset}_{temp}$$

$$0<\mathrm{Squal}=Q_{qualmeas}-(Q_{qualmin}{}^{*}+Q_{qualminoffset})-Q\mathrm{offset}_{temp}.$$

For a cell reselection procedure, there may be criteria to relax inter/intra-frequency measurements when the serving cell is good enough, and that may provide one or more of: intra-frequency reselection based on ranking of cells; inter-frequency reselection based on absolute priorities; a reselection timer ($T_{reselection}$) configured per frequency; one or more barred-lists that prevent the UE 115-*a* from reselecting to specific cells; or one or more allowed-lists that request the UE 115-*a* to reselect to only specific cells. In some cases cell reselection criteria may be signal strength or quality parameters that are measured for cells, such as selection criteria as defined in 3GPP TS38.304, which include:

Serving cell rank: $Rs=RSRPs+Qhyst-Qoffset_{temp}$

Neighbor cell rank: $Rn=RSRPn-Qoffset^{*}-Qoffset_{temp}$

The UE 115-*a* may also use a "rangeToBestCell" to allow selecting a cell with a lower rank but with more strong beams.

In some implementations as discussed herein, a cell in ES mode, which may also include a cell operating in a compensating mode, may change the configuration of SSB transmissions. In some cases, an ES mode cell may transmit SSBs with a different configuration than non-ES mode cells (e.g., the ES mode discovery signals 215 may have a different configuration than non-ES mode discovery signals 210). For example, the ES mode discovery signals 215 may have a periodicity longer than 20 ms (as used for non-ES mode discovery signals 210), a different SSB burst pattern, and the like. Further, in some cases, ES mode discovery signals 215 may be modified SSBs that are not sent on a synchronization raster that is associated with a channel access procedure. For example, modified SSBs may not have an associated RMSI, and the RMSI in such cases may be transmitted on-demand in response of trigger signal 220.

In some implementations a CD-SSB may be defined as a SSB that is transmitted on the synchronization raster associated with a channel access procedure, and that has associated RMSI transmission, and a non-CD-SSB may be defined as an SSB that is not transmitted on the synchronization raster associated with a channel access procedure, that does not have an associated RMSI transmission, or both. Additionally, or alternatively, a partial-CD-SSB may be a SSB that has a RMSI transmission that is on-demand or may be periodically transmitted. In some cases, a cell in ES mode may transmit a low-complexity reference signal (e.g., a KAS), and such cells may or may not transmit SSBs 225, or may transmit SSBs 225 only in response to a trigger signal 220.

In some aspects as discussed herein, a cell access procedure, such as a cell selection or reselection procedure, may be based on any ES mode discovery signal 215 from an ES mode cell that is usable by the UE 115-*a* to access a cell. Such ES mode discovery signals 215 may include an SSB (e.g., a CD-SSB) sent on an off-raster synchronization frequency (e.g., where the UE 115-*a* may be provided with information about the SSB center frequency via configuring SSB measurement timing configuration (SMTC) windows in system information block (SIB) 2 or 4). In some cases, one or more additional or different synchronization raster locations may be preconfigured in a specification that defines communications for the network, may be provided in system information or dedicated signaling (e.g., sent by another cell such as a serving cell) such as RRC signaling or in a medium access control (MAC) control element (CE), may be provided in a provisioned list provided by an operator of the PLMN, or any combinations thereof. In some cases, the ES mode discovery signals 215 may include partial-CD-SSBs (e.g., SSBs associated with on-demand RMSI). Additionally, or alternatively, the ES mode discovery signals 215 may include CSI-RS s.

In some implementations, the cell access procedure may be based on KASs transmitted by the second network entity 105-*b* as the ES mode discovery signals 215. In such implementations, the KASs may be a reference signal (e.g., similar to a primary synchronization signal (PSS)) that does not carry a full cell identification for the associated cell, and thus is not a reliable choice for cell selection or reselection (e.g., due to a chance that two or more different cells may select a same KAS ID from a set of available KAS IDs). In some cases, a KAS may be used to simplify the measurements for cell reselection. For example, the UE 115-*a* may be camping on a first cell associated with the first network entity 105-*a*, and may search for and measure neighboring cells such as a second cell associated with the second network entity 105-*b* to determine whether cell reselection should be performed. In such cases, upon detection of the KAS from the second cell, the UE 115-*a* may transmit trigger signal 220 to trigger the second network entity 105-*b* to transmit SSB 225.

In some cases, rather than transmit the trigger signal 220 in each case where the UE 115-*a* detects an ES mode discovery signal (e.g., a KAS), the UE 115-*a* may support skipping SSB-based measurements (for cell reselection) of one or more neighboring cells operating in ES mode that transmit only KASs. In such cases, the UE 115-*a* may transmit the trigger signal 220 when one or more conditions are satisfied. Examples of different conditions may include, for example: if the neighboring cell is not part a barred frequencies or cell (e.g., identified via KAS IDs) such as a cell ID or KAS ID included on a list of blacklisted intra-frequency neighboring cells or KAS IDs; a serving cell signal strength satisfies a first threshold (e.g., is greater than a first threshold value); the neighboring cell signal strength satisfies a second threshold (e.g., is less than a second threshold value); a frequency used by the neighboring cell (e.g., if the neighboring cell is at a different frequency with lower (or equal) priority than the serving cell frequency); a number of non-ES mode neighboring cells with equal or higher priority than that are detected and have better signal strength than detected in the KAS (e.g., based on SSB measurements of non-ES mode neighboring cells); a number of ES mode neighboring cells with equal or higher priority that are detected and already strong enough (e.g., using KAS-based measurements); access to the current serving cell or other measured neighboring cells that are not barred or reserved; or any combinations thereof. In some cases, the conditions may also be based at least in part on a timer (T), and the UE 115-*a* may transmit the trigger signal 220 if the associated condition is satisfied for a duration of the timer. As used herein, "satisfying a threshold" may, depending on the context, refer to a value being greater than the threshold, greater than or equal to the threshold, less than the threshold, less than or equal to the threshold, equal to the threshold, not equal to the threshold, or the like.

In some cases, whether or when to transmit the trigger signal 220 to trigger SSB may depend on one or more of the following parameters: a strength/quality of the serving cell (A) (e.g., Srxlev(A) and Squal(A)); a KAS-based strength/quality of neighboring cell (B) operating in ES mode (e.g., $Srxlev_{KAS}(B)$ and $Squal_{KAS}(B)$); a SSB/KAS frequency of the neighbor cell and its priority (e.g., intra-frequency and both cells are at the same frequency; or inter-frequency with the neighbor cell at a higher/equal/lower priority as the serving cell frequency); a signal strength or quality of the other non-ES mode neighboring cells (Be) (e.g., $Srxlev(B_n)$ and $Squal(B_n)$), where $B_n$ can be at the same frequency as the ES mode neighboring cell, or at a different frequency with higher/equal/lower priority the ES mode neighboring cell); a KAS-based strength or quality of ES mode neighboring cells ($B_m$) (e.g., $Srxlev_{KAS}(B_m)$ and $Squal_{KAS}(B_m)$, where $B_m$ can be at a same frequency or at different frequencies with higher/equal/lower priority); a number of detected/measured neighboring cells $B_n$ and $B_m$ at different frequencies; an access status (barred/reserved or not) of the serving cell, a candidate neighboring cell, one or more non-ES mode neighboring cells ($B_n$), or one or more ES mode neighboring cells ($B_m$); associated timers, thresholds, and offsets; or any combinations thereof. In some cases, these parameters may be defined in a cell-specific manner, being common to a frequency, or may depend on the frequencies and the associated priorities of the serving and neighboring cells.

In some implementations, configuration or control signaling may be provided to configure the parameters related to the one or more conditions. In some cases, the parameters may be preconfigured (e.g., provided in a specification), transmitted via system information (e.g., in SIB2/3/4), transmitted via dedicated RRC or MAC-CE messages, or any combinations thereof.

Figure 3:
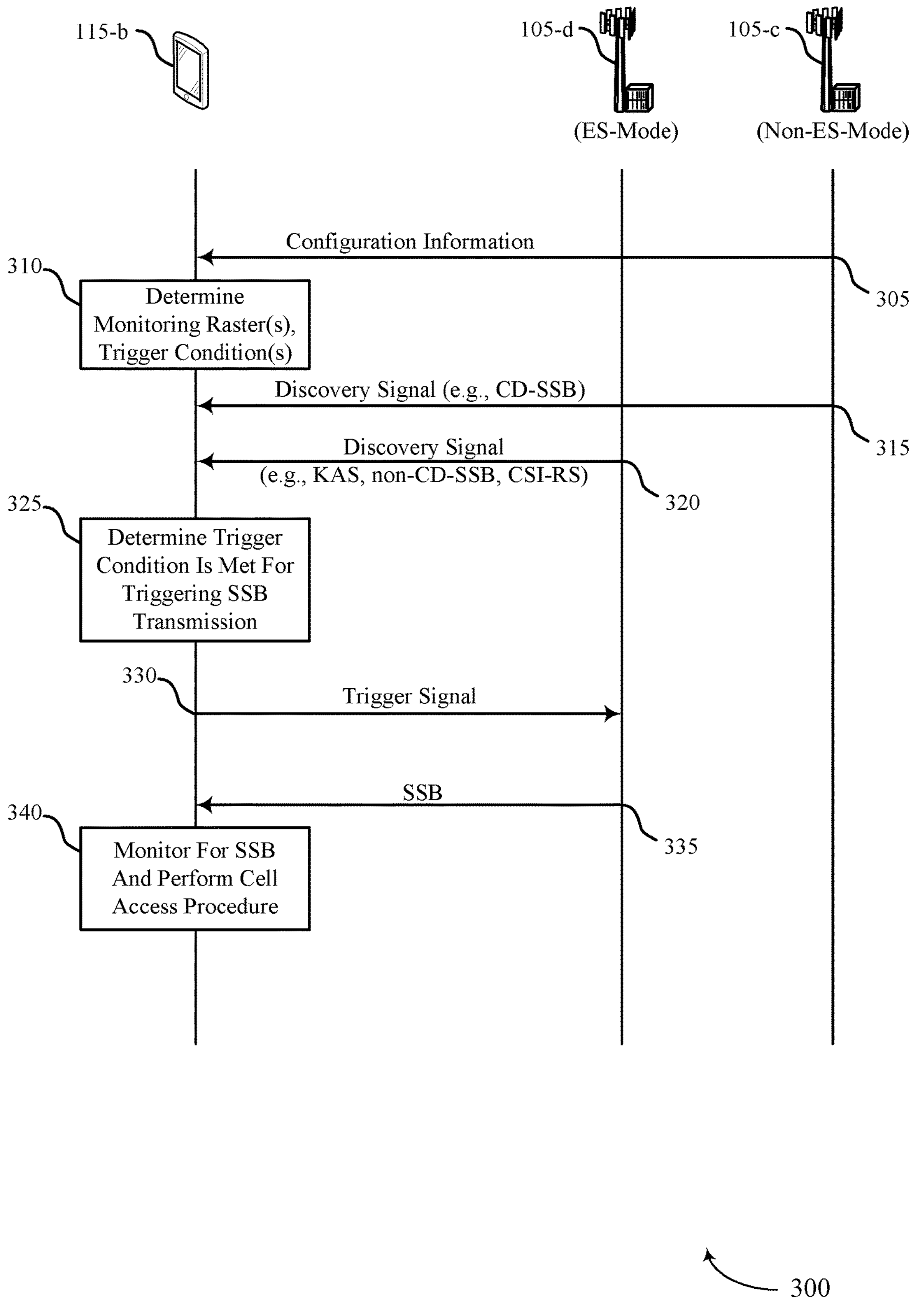
FIG. 3 illustrates an example of a process flow that supports cell selection in ES mode cells in accordance with one or more aspects of the present disclosure.

FIG. 3 illustrates an example of a process flow 300 that supports cell selection in ES mode cells in accordance with one or more aspects of the present disclosure. Aspects of the process flow 300 may implement, or be implemented by, aspects of the wireless communications system 100, or the wireless communications system 200, or any combination thereof. In particular, the process flow 300 illustrates a UE 115-*b*, a first network entity 105-*c*, and a second network entity 105-*d* may support cell selection in which one or more cells may operate in an ES mode, as described with reference to FIGS. 1-2, among other aspects.

The process flow 300 may include the UE 115-*b*, the first network entity 105-*c* operating in a non-ES mode, and the second network entity 105-*d* operating in an ES mode, which may be examples of UEs 115 and network entities 105 as described with reference to FIGS. 1-2. For example, the UE 115-*b* illustrated in FIG. 3 may be an example of the UE 115-*a* illustrated in FIG. 2. Similarly, the first network entity 105-*c* illustrated in FIG. 3 may be an example of the first network entity 105-*a*, and the second network entity 105-*d* may be an example of the second network entity 105-*b*, as illustrated in FIG. 2.

In some examples, the operations illustrated in process flow 300 may be performed by hardware (e.g., including circuitry, processing blocks, logic components, and other components), code (e.g., software) executed by a processor, or any combination thereof. Alternative examples of the following may be implemented, where some steps are performed in a different order than described or are not performed at all. In some cases, steps may include additional features not mentioned below, or further steps may be added.

At 305, the first network entity 105-*c* may output (e.g., transmit), to the UE 115-*b*, configuration information. In other words, the UE 115-*b* may obtain (e.g., receive) configuration information from the first network entity 105-*c*, which may be a serving cell. The configuration information may be provided in an RRC message, a DCI message, a MAC-CE message, and the like. In some cases, the configuration information may include information for performing a cell access procedure for one or more cells that may be operating in an ES mode. The configuration information may include, for example, information related to ES mode discovery signals (e.g., CD-SSBs and an associated synchronization raster), information related to non-ES mode discovery signals (e.g., KASs, non-CD-SSBs, reference signals, or any combinations thereof), one or more conditions for transmitting a trigger signal, and the like, as discussed in various aspects herein.

At 310, the UE 115-*b* may determine one or more monitoring rasters, one or more trigger conditions, or any combinations thereof. As discussed with reference to FIG. 2, the UE 115-*b* may be configured to monitor for non-ES mode discovery signals, and may determine to monitor for a SSB that is not on the synchronization raster associated with ES mode discovery signals, may determine to monitor for one or more KASs, and the like. In some cases, the UE 115-*b* may also identify one or more conditions for transmitting a trigger signal based at least in part on a non-ES mode discovery signal.

At 315, the first network entity 105-*c* may output (e.g., transmit) a discovery signal, such as a non-ES mode discovery signal that includes a CD-SSB (e.g., which may be an example of a first type of signaling for use in a cell access procedure for cells operating in a first energy mode). At 320, the second network entity 105-*d* may output (e.g., transmit) a discovery signal, such as an ES mode discovery signal that includes a non-CD-SSB, a KAS, a reference signal, or the like (e.g., which may be an example of a second type of signaling for use in a cell access procedure for cells operating in a second energy mode).

At 325, the UE 115-*b* may determine that a trigger condition is met for triggering a SSB transmission. In some cases, the trigger condition may be one of the conditions as discussed with reference to FIG. 2. In some cases, a timer may be started when the UE 115-*b* detects that a trigger condition is met, and if the trigger condition remains satisfied for a duration of the timer, the UE 115-*b* may determine that the trigger condition is met.

At 330, the UE 115-*b* may output (e.g., transmit) a trigger signal to the second network entity 105-*d*. At 335, based at least in part on the trigger signal, the UE 115-*b* may monitor for an SSB and perform a cell access procedure (e.g., a cell selection or reselection procedure). At 340, based at least in part on the trigger signal, the second network entity 105-*d* may output (e.g., transmit) a SSB, which may be obtained (e.g., received) at the UE 115-*b*, and measured as part of the cell access procedure.

Figure 4:
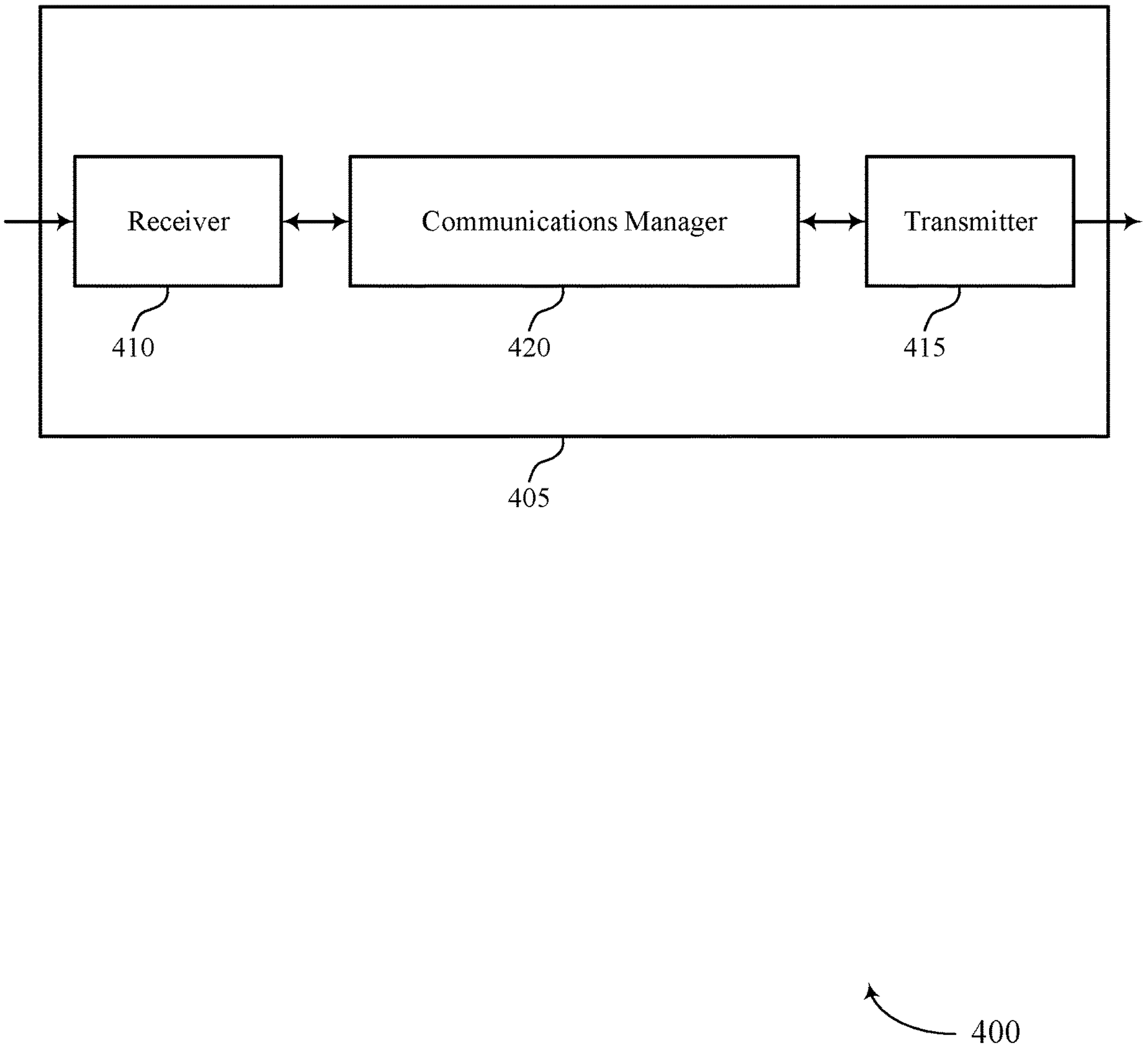
FIGS. 4 and 5 show block diagrams of devices that support cell selection in ES mode cells in accordance with one or more aspects of the present disclosure.

FIG. 4 shows a block diagram 400 of a device 405 that supports cell selection in ES mode cells in accordance with one or more aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to cell selection in ES mode cells). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to cell selection in ES mode cells). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of cell selection in ES mode cells as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

The communications manager 420 may support wireless communication at a UE in accordance with examples as disclosed herein. For example, the communications manager 420 may be configured as or otherwise support a means for establishing wireless connectivity via a first network entity. The communications manager 420 may be configured as or otherwise support a means for receiving a discovery signal from a second network entity, where the discovery signal contains less information than a synchronization signal block for use in a cell access procedure. The communications manager 420 may be configured as or otherwise support a means for transmitting, based on one or more conditions associated with the discovery signal being satisfied, a trigger signal to the second network entity to transmit the synchronization signal block for use in the cell access procedure, where the cell access procedure is based at least in part on signal measurements of both the first network entity and the second network entity. The communications manager 420 may be configured as or otherwise support a means for monitoring for the synchronization signal block based on the trigger signal.

Additionally, or alternatively, the communications manager 420 may support wireless communication at a UE in accordance with examples as disclosed herein. For example, the communications manager 420 may be configured as or otherwise support a means for receiving configuration information for a first type of signaling for use in a cell access procedure for cells operating in a first energy mode and a second type of signaling for use in the cell access procedure for a cell operating in a second energy mode that uses less energy than the first energy mode, where the first type of signaling includes a synchronization signal block transmitted on a first synchronization raster that has associated system information for the cell access procedure, and where the second type of signaling includes one or more of a measurement reference signal, a synchronization signal block transmitted on a different synchronization raster than the first synchronization raster, or a synchronization signal block transmitted without the associated system information. The communications manager 420 may be configured as or otherwise support a means for receiving at least one instance of the second type of signaling. The communications manager 420 may be configured as or otherwise support a means for performing a cell access procedure with a cell based on the second type of signaling.

By including or configuring the communications manager 420 in accordance with examples as described herein, the device 405 (e.g., a processor controlling or otherwise coupled with the receiver 410, the transmitter 415, the communications manager 420, or a combination thereof) may support techniques for operation of network entities in an ES mode and also provide for cell access procedures that are based on signals from ES mode cells and non-ES mode cells. As such, techniques described herein may provide for efficient network operation while also reducing network power consumption. Further, by enabling the UE to trigger SSB transmissions from ES mode cells, cell access may be enhanced and provide cell selection of a suitable cell from cells operating in different modes, which may provide more efficient communications and enhanced overall efficiency and reliability of the wireless communication system.

Figure 5:
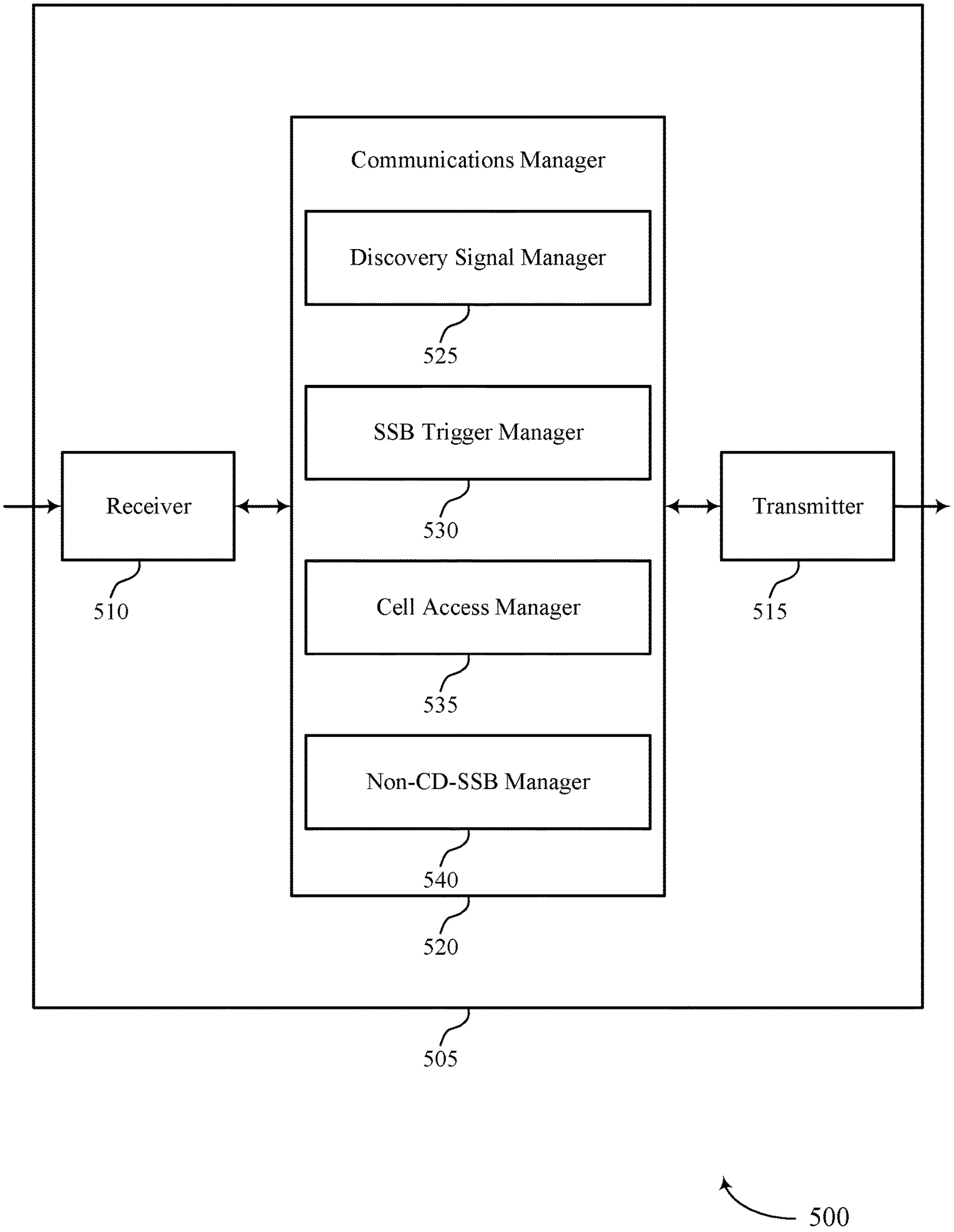

FIG. 5 shows a block diagram 500 of a device 505 that supports cell selection in ES mode cells in accordance with one or more aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to cell selection in ES mode cells). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to cell selection in ES mode cells). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of cell selection in ES mode cells as described herein. For example, the communications manager 520 may include a discovery signal manager 525, an SSB trigger manager 530, a cell access manager 535, a non-CD-SSB manager 540, or any combination thereof. The communications manager 520 may be an example of aspects of a communications manager 420 as described herein. In some examples, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a UE in accordance with examples as disclosed herein. The cell access manager 535 may be configured as or otherwise support a means for establishing wireless connectivity via a first network entity. The discovery signal manager 525 may be configured as or otherwise support a means for receiving a discovery signal from a second network entity, where the discovery signal contains less information than a synchronization signal block for use in a cell access procedure. The SSB trigger manager 530 may be configured as or otherwise support a means for transmitting, based on one or more conditions associated with the discovery signal being satisfied, a trigger signal to the second network entity to transmit the synchronization signal block for use in the cell access procedure, where the cell access procedure is based at least in part on signal measurements of both the first network entity and the second network entity. The cell access manager 535 may be configured as or otherwise support a means for monitoring for the synchronization signal block based on the trigger signal.

Additionally, or alternatively, the communications manager 520 may support wireless communication at a UE in accordance with examples as disclosed herein. The non-CD-SSB manager 540 may be configured as or otherwise support a means for receiving configuration information for a first type of signaling for use in a cell access procedure for cells operating in a first energy mode and a second type of signaling for use in the cell access procedure for a cell operating in a second energy mode that uses less energy than the first energy mode, where the first type of signaling includes a synchronization signal block transmitted on a first synchronization raster that has associated system information for the cell access procedure, and where the second type of signaling includes one or more of a measurement reference signal, a synchronization signal block transmitted on a different synchronization raster than the first synchronization raster, or a synchronization signal block transmitted without the associated system information. The non-CD-SSB manager 540 may be configured as or otherwise support a means for receiving at least one instance of the second type of signaling. The cell access manager 535 may be configured as or otherwise support a means for performing a cell access procedure with a cell based on the second type of signaling.

Figure 6:
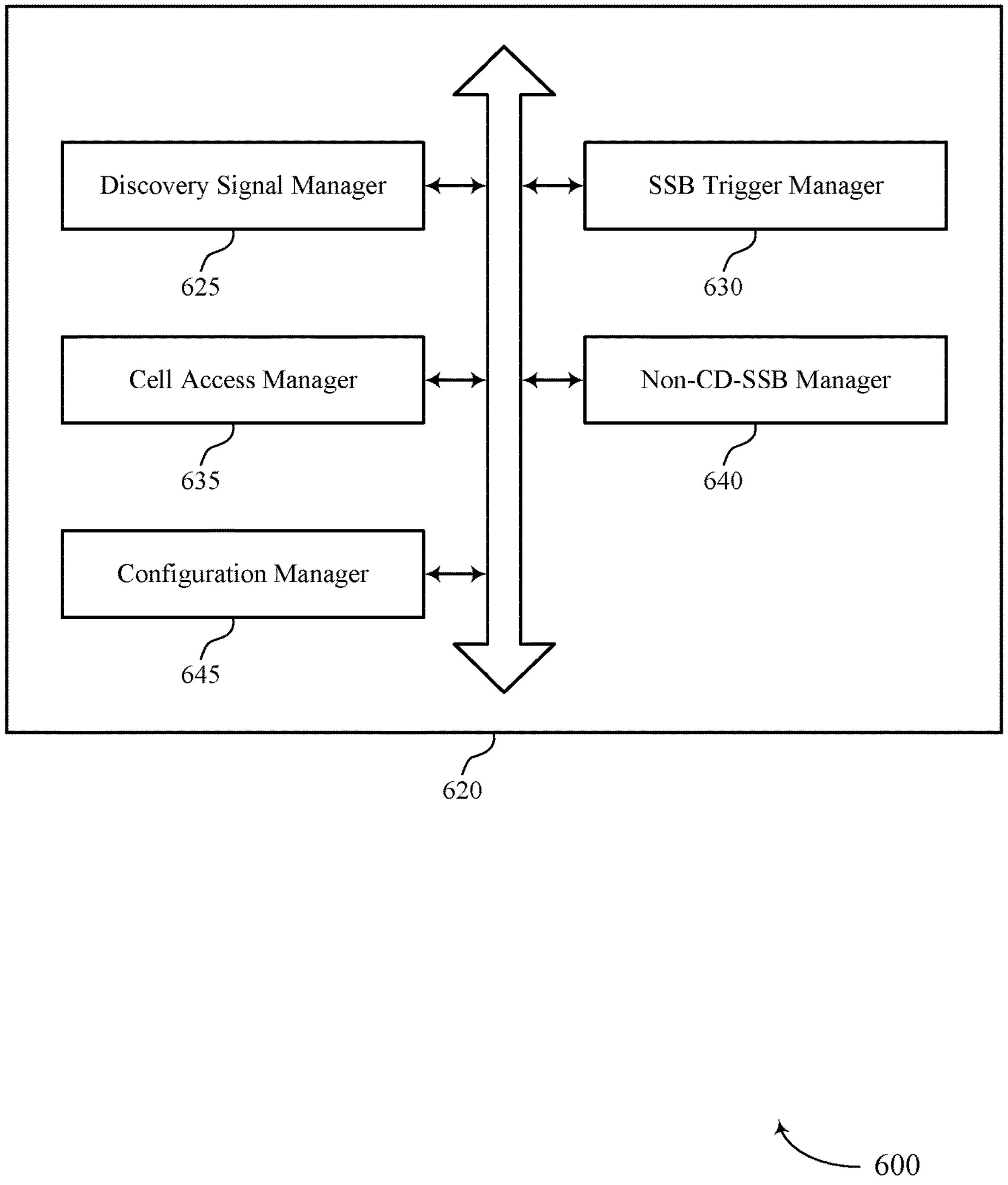
FIG. 6 shows a block diagram of a communications manager that supports cell selection in ES mode cells in accordance with one or more aspects of the present disclosure.

FIG. 6 shows a block diagram 600 of a communications manager 620 that supports cell selection in ES mode cells in accordance with one or more aspects of the present disclosure. The communications manager 620 may be an example of aspects of a communications manager 420, a communications manager 520, or both, as described herein. The communications manager 620, or various components thereof, may be an example of means for performing various aspects of cell selection in ES mode cells as described herein. For example, the communications manager 620 may include a discovery signal manager 625, an SSB trigger manager 630, a cell access manager 635, a non-CD-SSB manager 640, a configuration manager 645, or any combination thereof. Each of these components may communicate, directly or indirectly, with one another (e.g., via one or more buses).

The communications manager 620 may support wireless communication at a UE in accordance with examples as disclosed herein. The cell access manager 635 may be configured as or otherwise support a means for establishing wireless connectivity via a first network entity. The discovery signal manager 625 may be configured as or otherwise support a means for receiving a discovery signal from a second network entity, where the discovery signal contains less information than a synchronization signal block for use in a cell access procedure. The SSB trigger manager 630 may be configured as or otherwise support a means for transmitting, based on one or more conditions associated with the discovery signal being satisfied, a trigger signal to the second network entity to transmit the synchronization signal block for use in the cell access procedure, where the cell access procedure is based at least in part on signal measurements of both the first network entity and the second network entity. The cell access manager 635 may be configured as or otherwise support a means for monitoring for the synchronization signal block based on the trigger signal.

In some examples, the discovery signal is a reference signal that provides less than a full cell identification associated with the second network entity. In some examples, the discovery signal is a keep alive signal that provides less than a full cell identification associated with the second network entity.

In some examples, the one or more conditions include at least one of: whether one or more of a non-blocked frequency is used for transmission of the discovery signal; whether a non-blocked cell is associated with the discovery signal; whether a signal strength of the discovery signal satisfies a first threshold; whether a number of neighbor network entities, that are detected to have a signal strength that satisfies a second threshold and a higher selection priority than the second network entity that transmits discovery signal, satisfies a third threshold; whether a serving cell signal strength satisfies a fourth threshold; or any combinations thereof.

In some examples, the trigger signal initiates a transmission of a cell-defining synchronization signal block from the second network entity. In some examples, the configuration manager 645 may be configured as or otherwise support a means for receiving information that includes at least a portion of the one or more conditions. In some examples, the information is received in system information, in RRC signaling, in a MAC-CE, or any combinations thereof.

In some examples, at least one of the one or more conditions are defined for triggering the second network entity operating in an energy-saving mode to transmit the synchronization signal block for use in the cell access procedure. In some examples, the SSB trigger manager 630 may be configured as or otherwise support a means for starting a timer for transmitting the trigger signal responsive to the one or more conditions being satisfied, and where the transmitting the trigger signal is based on the one or more conditions being satisfied for a duration of the timer. In some examples, the one or more conditions include one or more of: whether a signal strength or quality of a serving cell, a signal strength or quality of the discovery signal, or both, satisfies a first threshold; whether a frequency of the discovery signal and a priority associated with the frequency exceeds a priority of a serving cell; whether a signal strength or quality of at least a first neighboring network entity operating on a non-energy-saving mode satisfies a second threshold; whether a signal strength or quality of at least a second neighboring network entity operating on an energy-saving mode satisfies a third threshold; whether a first number of detected network entities operating in the non-energy-saving mode exceeds a second number of detected network entities operating in the energy-saving mode, for two or more different frequencies; whether a barred or reserved channel access status is detected for one or more of the second network entity, the first neighboring network entity, or the second neighboring network entity; whether one or more thresholds for one or more measured parameters is satisfied for a timer duration associated with the one or more thresholds; or any combinations thereof. In some examples, the one or more conditions are cell-specific conditions for a cell associated with the second network entity, frequency-specific conditions for a frequency associated with the discovery signal, beam-specific conditions for a beam associated with a cell of the second network entity, or any combinations thereof.

Additionally, or alternatively, the communications manager 620 may support wireless communication at a UE in accordance with examples as disclosed herein. The non-CD-SSB manager 640 may be configured as or otherwise support a means for receiving configuration information for a first type of signaling for use in a cell access procedure for cells operating in a first energy mode and a second type of signaling for use in the cell access procedure for a cell operating in a second energy mode that uses less energy than the first energy mode, where the first type of signaling includes a synchronization signal block transmitted on a first synchronization raster that has associated system information for the cell access procedure, and where the second type of signaling includes one or more of a measurement reference signal, a synchronization signal block transmitted on a different synchronization raster than the first synchronization raster, or a synchronization signal block transmitted without the associated system information. In some examples, the non-CD-SSB manager 640 may be configured as or otherwise support a means for receiving at least one instance of the second type of signaling. In some examples, the cell access manager 635 may be configured as or otherwise support a means for performing a cell access procedure with a cell based on the second type of signaling.

In some examples, the first type of signaling provides a CD-SSB transmitted on the first synchronization raster that has an associated RMSI transmission. In some examples, the second type of signaling is a non-CD-SSB. In some examples, the second type of signaling is an SSB transmitted on a frequency that is off the first synchronization raster associated with CD-SSBs. In some examples, the second type of signaling is a partial-CD-SSB that has the associated RMSI transmitted in fewer than all instances of SSBs, transmitted on fewer than all beam directions, or transmitted based on a trigger signal from the UE. In some examples, the second type of signaling is a CSI reference signal. In some examples, the configuration information is provided in a system information block, dedicated signaling, radio resource control signaling, a provisioned list of an operator associated with the UE, or any combinations thereof. In some examples, the second type of signaling is defined for cells operating in the second energy mode.

Figure 7:
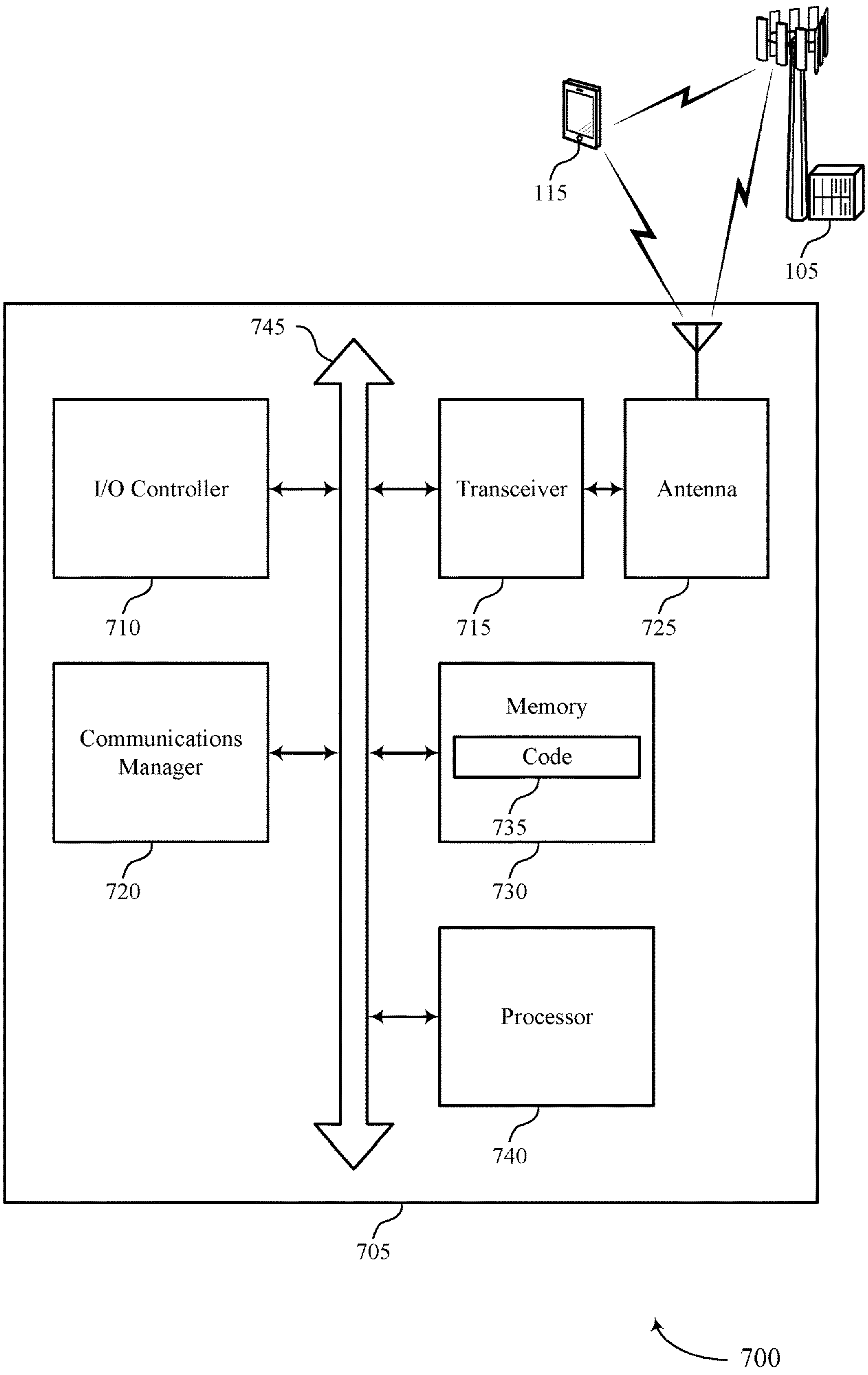
FIG. 7 shows a diagram of a system including a device that supports cell selection in ES mode cells in accordance with one or more aspects of the present disclosure.

FIG. 7 shows a diagram of a system 700 including a device 705 that supports cell selection in ES mode cells in accordance with one or more aspects of the present disclosure. The device 705 may be an example of or include the components of a device 405, a device 505, or a UE 115 as described herein. The device 705 may communicate (e.g., wirelessly) with one or more network entities 105, one or more UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally, or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed)

to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting cell selection in ES mode cells). For example, the device 705 or a component of the device 705 may include a processor 740 and memory 730 coupled with or to the processor 740, the processor 740 and memory 730 configured to perform various functions described herein.

The communications manager 720 may support wireless communication at a UE in accordance with examples as disclosed herein. For example, the communications manager 720 may be configured as or otherwise support a means for establishing wireless connectivity via a first network entity. The communications manager 720 may be configured as or otherwise support a means for receiving a discovery signal from a second network entity, where the discovery signal contains less information than a synchronization signal block for use in a cell access procedure. The communications manager 720 may be configured as or otherwise support a means for transmitting, based on one or more conditions associated with the discovery signal being satisfied, a trigger signal to the second network entity to transmit the synchronization signal block for use in the cell access procedure, where the cell access procedure is based at least in part on signal measurements of both the first network entity and the second network entity. The communications manager 720 may be configured as or otherwise support a means for monitoring for the synchronization signal block based on the trigger signal.

Additionally, or alternatively, the communications manager 720 may support wireless communication at a UE in accordance with examples as disclosed herein. For example, the communications manager 720 may be configured as or otherwise support a means for receiving configuration information for a first type of signaling for use in a cell access procedure for cells operating in a first energy mode and a second type of signaling for use in the cell access procedure for a cell operating in a second energy mode that uses less energy than the first energy mode, where the first type of signaling includes a synchronization signal block transmitted on a first synchronization raster that has associated system information for the cell access procedure, and where the second type of signaling includes one or more of a measurement reference signal, a synchronization signal block transmitted on a different synchronization raster than the first synchronization raster, or a synchronization signal block transmitted without the associated system information. The communications manager 720 may be configured as or otherwise support a means for receiving at least one instance of the second type of signaling. The communications manager 720 may be configured as or otherwise support a means for performing a cell access procedure with a cell based on the second type of signaling.

By including or configuring the communications manager 720 in accordance with examples as described herein, the device 705 may support techniques for operation of network entities in an ES mode and also provide for cell access procedures that are based on signals from ES mode cells and non-ES mode cells. As such, techniques described herein may provide for efficient network operation while also reducing network power consumption. Further, by enabling the UE to trigger SSB transmissions from ES mode cells, cell access may be enhanced and provide cell selection of a suitable cell from cells operating in different modes, which may provide more efficient communications and enhanced overall efficiency and reliability of the wireless communication system.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of cell selection in ES mode cells as described herein, or the processor 740 and the memory 730 may be otherwise configured to perform or support such operations.

Figure 8:
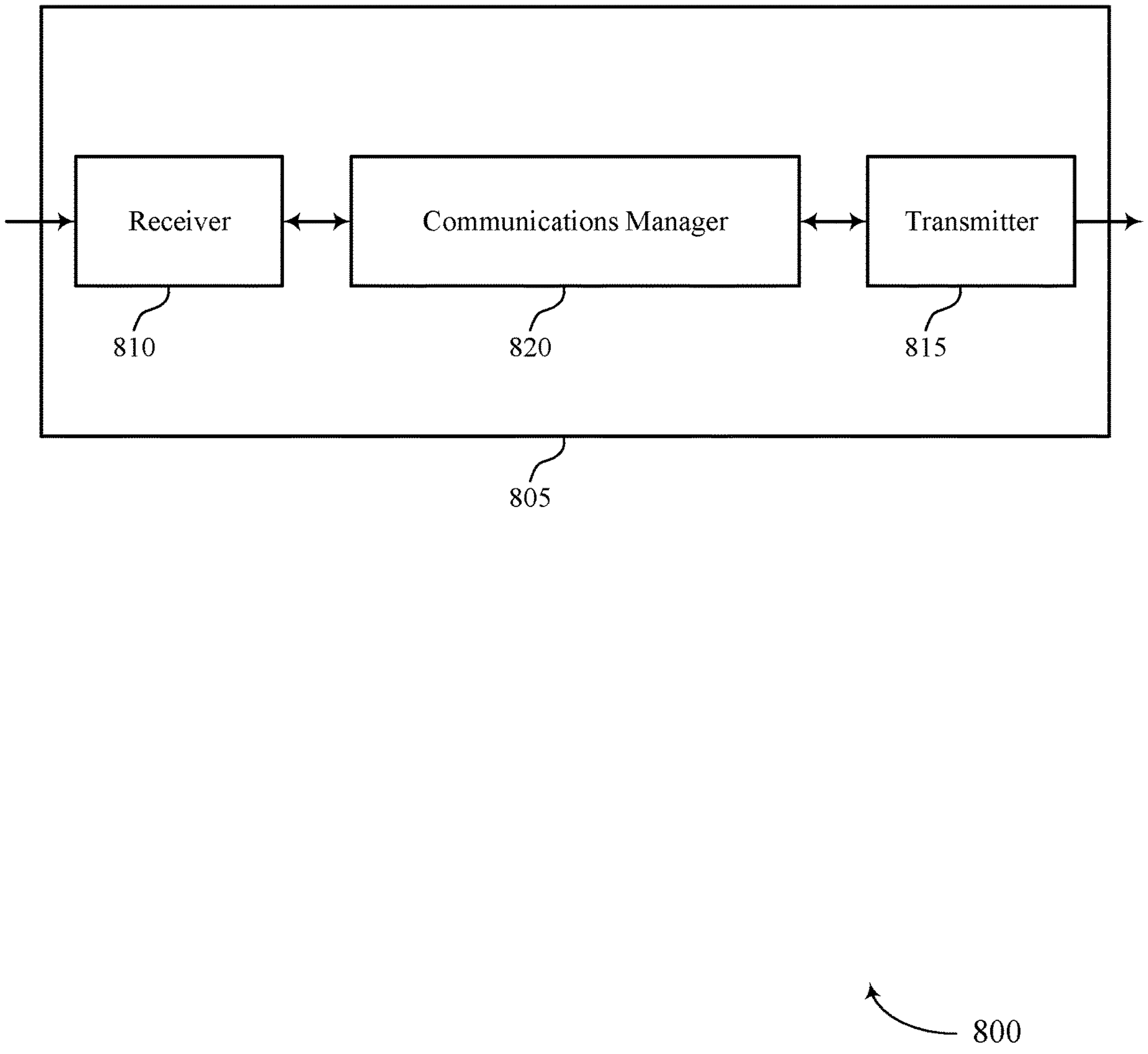
FIGS. 8 and 9 show block diagrams of devices that support cell selection in ES mode cells in accordance with one or more aspects of the present disclosure.

FIG. 8 shows a block diagram 800 of a device 805 that supports cell selection in ES mode cells in accordance with one or more aspects of the present disclosure. The device 805 may be an example of aspects of a network entity 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 805. In some examples, the receiver 810 may support obtaining information by receiving signals via one or more antennas. Additionally, or alternatively, the receiver 810 may support obtaining information by receiving signals via one or more wired (e.g., electrical, fiber optic) interfaces, wireless interfaces, or any combination thereof.

The transmitter 815 may provide a means for outputting (e.g., transmitting, providing, conveying, sending) information generated by other components of the device 805. For example, the transmitter 815 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 815 may support outputting information by transmitting signals via one or more antennas. Additionally, or alternatively, the transmitter 815 may support outputting information by transmitting signals via one or more wired (e.g., electrical, fiber optic) interfaces, wireless interfaces, or any combination thereof. In some examples, the transmitter 815 and the receiver 810 may be co-located in a transceiver, which may include or be coupled with a modem.

The communications manager 820, the receiver 810, the transmitter 815, or various combinations thereof or various components thereof may be examples of means for performing various aspects of cell selection in ES mode cells as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at a network entity in accordance with examples as disclosed herein. For example, the communications manager 820 may be configured as or otherwise support a means for transmitting a discovery signal while operating in an energy-saving mode, where the discovery signal contains less information than a synchronization signal block for use in a cell access procedure. The communications manager 820 may be configured as or otherwise support a means for receiving, from a UE based on the discovery signal, a trigger signal that indicates a synchronization signal block for use in the cell access procedure is to be transmitted. The communications manager 820 may be configured as or otherwise support a means for transmitting the synchronization signal block based on the trigger signal.

Additionally, or alternatively, the communications manager 820 may support wireless communication at a network entity in accordance with examples as disclosed herein. For example, the communications manager 820 may be configured as or otherwise support a means for transmitting configuration information to a UE for a first type of signaling for use in a cell access procedure for cells operating in a first energy mode and a second type of signaling for use in the cell access procedure for a cell operating in a second energy mode that uses less energy than the first energy mode, where the first type of signaling includes a synchronization signal block transmitted on a first synchronization raster that has associated system information for the cell access procedure, and where the second type of signaling includes one or more of a measurement reference signal, a synchronization signal block transmitted on a different synchronization raster than the first synchronization raster, or a synchronization signal block transmitted without the associated system information. The communications manager 820 may be configured as or otherwise support a means for receiving, from the UE, an indication of a cell that is operating in the second energy mode as part of the cell access procedure. The communications manager 820 may be configured as or otherwise support a means for performing the cell access procedure based on the indication from the UE.

By including or configuring the communications manager 820 in accordance with examples as described herein, the device 805 (e.g., a processor controlling or otherwise coupled with the receiver 810, the transmitter 815, the communications manager 820, or a combination thereof) may support techniques for operation of network entities in an ES mode and also provide for cell access procedures that are based on signals from ES mode cells and non-ES mode cells. As such, techniques described herein may provide for efficient network operation while also reducing network power consumption. Further, by enabling the UE to trigger SSB transmissions from ES mode cells, cell access may be enhanced and provide cell selection of a suitable cell from cells operating in different modes, which may provide more efficient communications and enhanced overall efficiency and reliability of the wireless communication system.

Figure 9:
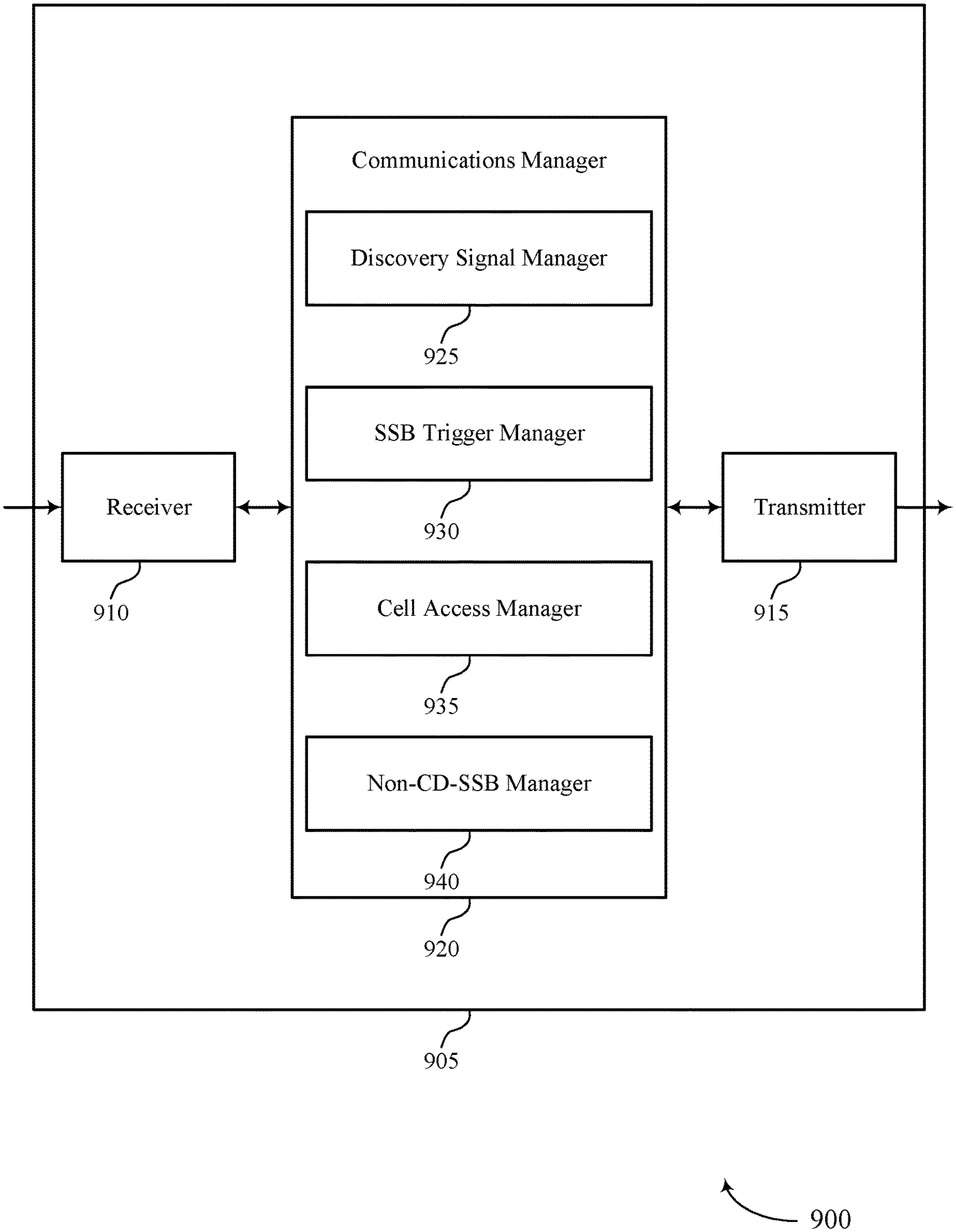

FIG. 9 shows a block diagram 900 of a device 905 that supports cell selection in ES mode cells in accordance with one or more aspects of the present disclosure. The device 905 may be an example of aspects of a device 805 or a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The device 905, or various components thereof, may be an example of means for performing various aspects of cell selection in ES mode cells as described herein. For example, the communications manager 920 may include a discovery signal manager 925, an SSB trigger manager 930, a cell access manager 935, a non-CD-SSB manager 940, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a network entity in accordance with examples as disclosed herein. The discovery signal manager 925 may be configured as or otherwise support a means for transmitting a discovery signal while operating in an energy-saving mode, where the discovery signal contains less information than a synchronization signal block for use in a cell access procedure. The SSB trigger manager 930 may be configured as or otherwise support a means for receiving, from a UE based on the discovery signal, a trigger signal that indicates a synchronization signal block for use in the cell access procedure is to be transmitted. The cell access manager 935 may be configured as or otherwise support a means for transmitting the synchronization signal block based on the trigger signal.

Additionally, or alternatively, the communications manager 920 may support wireless communication at a network entity in accordance with examples as disclosed herein. The non-CD-SSB manager 940 may be configured as or otherwise support a means for transmitting configuration information to a UE for a first type of signaling for use in a cell access procedure for cells operating in a first energy mode and a second type of signaling for use in the cell access procedure for a cell operating in a second energy mode that uses less energy than the first energy mode, where the first type of signaling includes a synchronization signal block transmitted on a first synchronization raster that has associated system information for the cell access procedure, and where the second type of signaling includes one or more of a measurement reference signal, a synchronization signal block transmitted on a different synchronization raster than the first synchronization raster, or a synchronization signal block transmitted without the associated system information. The non-CD-SSB manager 940 may be configured as or otherwise support a means for receiving, from the UE, an indication of a cell that is operating in the second energy mode as part of the cell access procedure. The cell access manager 935 may be configured as or otherwise support a means for performing the cell access procedure based on the indication from the UE.

Figure 10:
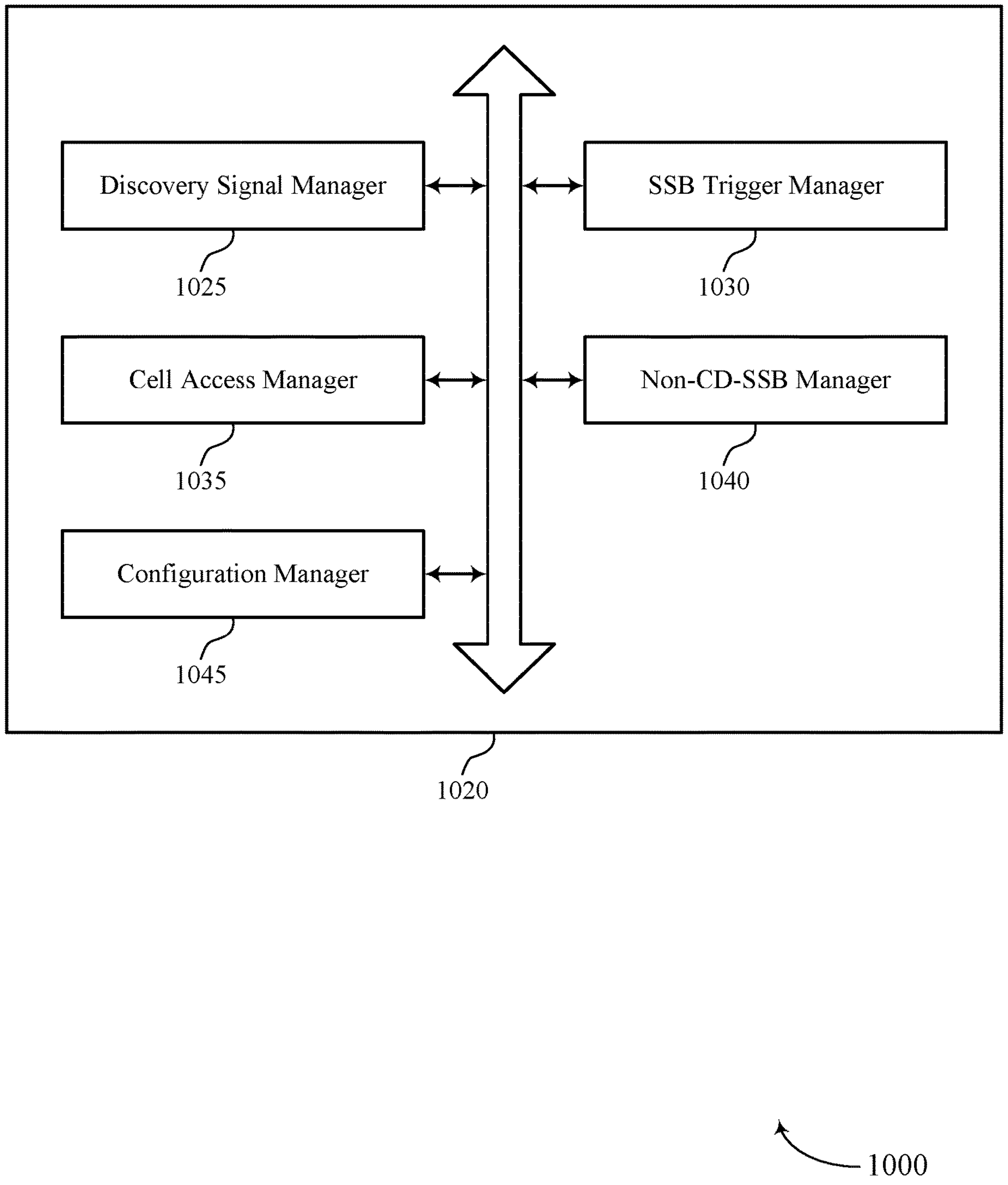
FIG. 10 shows a block diagram of a communications manager that supports cell selection in ES mode cells in accordance with one or more aspects of the present disclosure.

FIG. 10 shows a block diagram 1000 of a communications manager 1020 that supports cell selection in ES mode cells in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of cell selection in ES mode cells as described herein. For example, the communications manager 1020 may include a discovery signal manager 1025, an SSB trigger manager 1030, a cell access manager 1035, a non-CD-SSB manager 1040, a configuration manager 1045, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1020 may support wireless communication at a network entity in accordance with examples as disclosed herein. The discovery signal manager 1025 may be configured as or otherwise support a means for transmitting a discovery signal while operating in an energy-saving mode, where the discovery signal contains less information than a synchronization signal block for use in a cell access procedure. The SSB trigger manager 1030 may be configured as or otherwise support a means for receiving, from a UE based on the discovery signal, a trigger signal that indicates a synchronization signal block for use in the cell access procedure is to be transmitted. The cell access manager 1035 may be configured as or otherwise support a means for transmitting the synchronization signal block based on the trigger signal.

In some examples, the discovery signal is a reference signal provides less than a full cell identification associated with the network entity. In some examples, the discovery signal is a keep alive signal that provides less than a full cell identification associated with the network entity.

In some examples, the UE is configured with one or more conditions for transmitting the trigger signal, and where the one or more conditions include at least one of: whether one or more of a non-blocked frequency is used for transmission of the discovery signal; whether a non-blocked cell is associated with the discovery signal; whether a signal strength of the discovery signal satisfies a first threshold; whether a number of neighbor network entities, that are detected to have a signal strength that satisfies a second threshold and a higher selection priority than the network entity that transmits discovery signal, satisfies a third threshold; whether a serving cell signal strength satisfies a fourth threshold; or any combinations thereof. In some examples, the synchronization signal block is a cell-defining synchronization signal block transmitted on a defined synchronization raster frequency and having an associated remaining minimum remaining system information transmission.

In some examples, the configuration manager 1045 may be configured as or otherwise support a means for transmitting configuration information to the UE that includes one or more conditions that are to be satisfied prior to transmitting the trigger signal. In some examples, the configuration information is transmitted in system information, in RRC signaling, in a MAC-CE, or any combinations thereof.

In some examples, at least one of the one or more conditions are defined for triggering the network entity operating in the energy-saving mode to transmit the synchronization signal block for use in the cell access procedure. In some examples, the configuration information includes a timer value associated with the trigger signal, and where the trigger signal is transmitted based on at least one of the one or more conditions being satisfied for a duration of the timer value.

In some examples, the one or more conditions include one or more of: whether a signal strength or quality of a serving cell, a signal strength or quality of the discovery signal, or both, satisfies a first threshold; whether a frequency of the discovery signal and a priority associated with the frequency exceeds a priority of a serving cell; whether a signal strength or quality of at least a first neighboring network entity operating on a non-energy-saving mode satisfies a second threshold; whether a signal strength or quality of at least a second neighboring network entity operating on the energy-saving mode satisfies a third threshold; whether a first number of detected network entities operating in the non-energy-saving mode exceeds a second number of detected network entities operating in the energy-saving mode, for two or more different frequencies; whether a barred or reserved channel access status is detected for one or more of the network entity, the first neighboring network entity, or the second neighboring network entity; whether one or more thresholds for one or more measured parameters is satisfied for a timer duration associated with the one or more thresholds; or any combinations thereof. In some examples, the one or more conditions are cell-specific conditions for a cell associated with the network entity, frequency-specific conditions for a frequency associated with the discovery signal, beam-specific conditions for a beam associated with a cell of the network entity, or any combinations thereof.

Additionally, or alternatively, the communications manager 1020 may support wireless communication at a network entity in accordance with examples as disclosed herein. The non-CD-SSB manager 1040 may be configured as or otherwise support a means for transmitting configuration information to a UE for a first type of signaling for use in a cell access procedure for cells operating in a first energy mode and a second type of signaling for use in the cell access procedure for a cell operating in a second energy mode that uses less energy than the first energy mode, where the first type of signaling includes a synchronization signal block transmitted on a first synchronization raster that has associated system information for the cell access procedure, and where the second type of signaling includes one or more of a measurement reference signal, a synchronization signal block transmitted on a different synchronization raster than the first synchronization raster, or a synchronization signal block transmitted without the associated system information. In some examples, the non-CD-SSB manager 1040 may be configured as or otherwise support a means for receiving, from the UE, an indication of a cell that is operating in the second energy mode as part of the cell access procedure. In some examples, the cell access manager 1035 may be configured as or otherwise support a means for performing the cell access procedure based on the indication from the UE.

In some examples, the first type of signaling provides a CD-SSB transmitted on the first synchronization raster that has an associated RMSI transmission. In some examples, the second type of signaling is a non-CD-SSB. In some examples, the second type of signaling is an SSB transmitted on a frequency that is off the first synchronization raster associated with CD-SSBs. In some examples, the second type of signaling is a partial-CD-SSB that has the associated RMSI transmitted in fewer than all instances of SSBs, transmitted on fewer than all beam directions, or transmitted based on a trigger signal from the UE. In some examples, the second type of signaling is a CSI reference signal. In some examples, the configuration information is provided in a system information block, dedicated signaling, radio resource control signaling, a provisioned list of an operator associated with the UE, or any combinations thereof. In some examples, the second type of signaling is defined for cells operating in the second energy mode.

Figure 11:
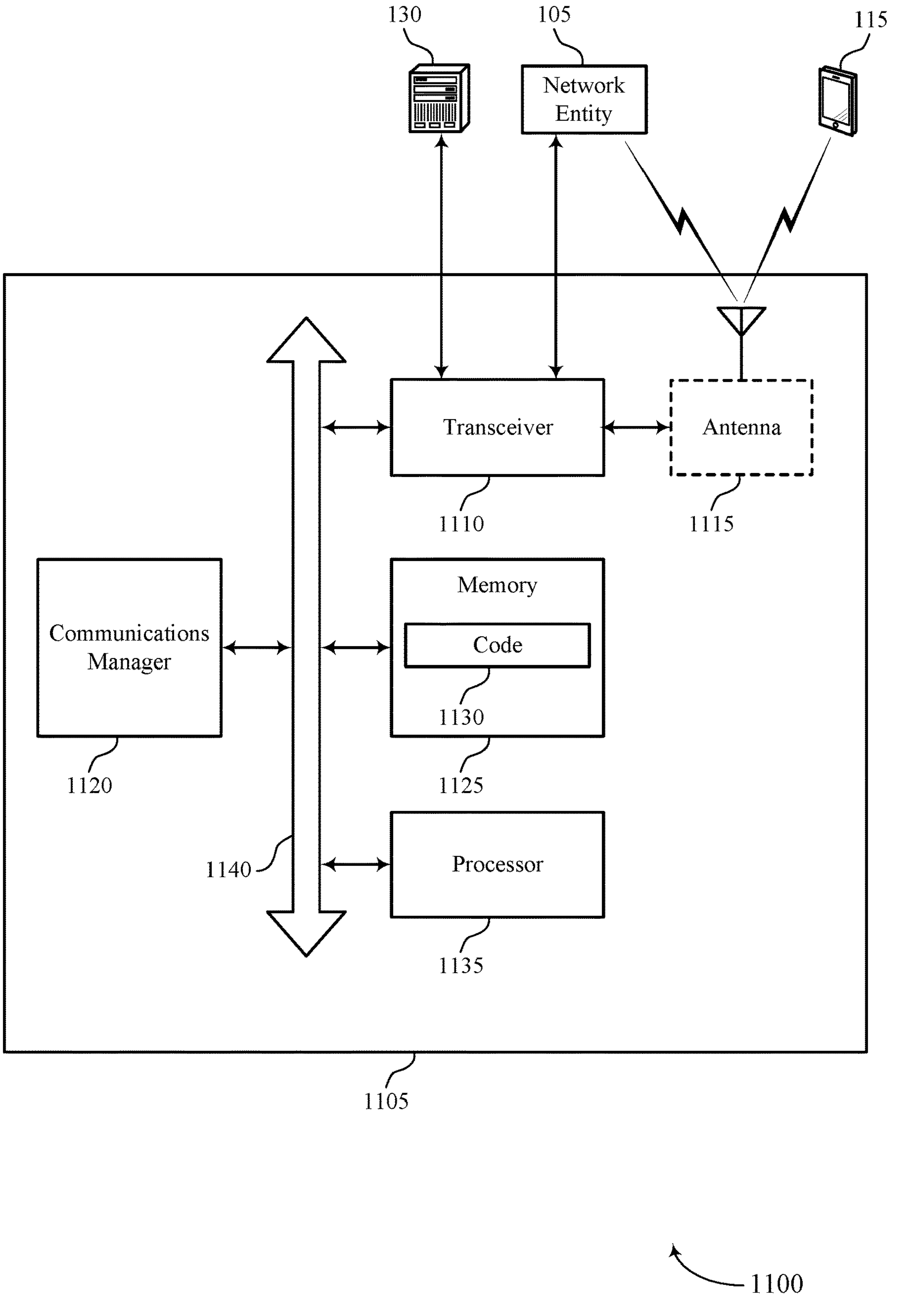
FIG. 11 shows a diagram of a system including a device that supports cell selection in ES mode cells in accordance with one or more aspects of the present disclosure.

FIG. 11 shows a diagram of a system 1100 including a device 1105 that supports cell selection in ES mode cells in accordance with one or more aspects of the present disclosure. The device 1105 may be an example of or include the components of a device 805, a device 905, or a network entity 105 as described herein. The device 1105 may communicate with one or more network entities 105, one or more UEs 115, or any combination thereof, which may include communications over one or more wired interfaces, over one or more wireless interfaces, or any combination thereof. The device 1105 may include components that support outputting and obtaining communications, such as a communications manager 1120, a transceiver 1110, an antenna 1115, a memory 1125, code 1130, and a processor 1135. These components may be in electronic communication or otherwise coupled (e.g., operatively, communicatively, functionally, electronically, electrically) via one or more buses (e.g., a bus 1140).

The transceiver 1110 may support bi-directional communications via wired links, wireless links, or both as described herein. In some examples, the transceiver 1110 may include a wired transceiver and may communicate bi-directionally with another wired transceiver. Additionally, or alternatively, in some examples, the transceiver 1110 may include a wireless transceiver and may communicate bi-directionally with another wireless transceiver. In some examples, the device 1105 may include one or more antennas 1115, which may be capable of transmitting or receiving wireless transmissions (e.g., concurrently). The transceiver 1110 may also include a modem to modulate signals, to provide the modulated signals for transmission (e.g., by one or more antennas 1115, by a wired transmitter), to receive modulated signals (e.g., from one or more antennas 1115, from a wired receiver), and to demodulate signals. The transceiver 1110, or the transceiver 1110 and one or more antennas 1115 or wired interfaces, where applicable, may be an example of a transmitter 815, a transmitter 915, a receiver 810, a receiver 910, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1125 may include RAM and ROM. The memory 1125 may store computer-readable, computer-executable code 1130 including instructions that, when executed by the processor 1135, cause the device 1105 to perform various functions described herein. The code 1130 may be stored in a non-transitory computer-readable medium such as system memory or another type of memory. In some cases, the code 1130 may not be directly executable by the processor 1135 but may cause a computer (e.g., when compiled and executed) to perform functions described herein. In some cases, the memory 1125 may contain, among other things, a BIOS which may control basic hardware or software operation such as the interaction with peripheral components or devices.

The processor 1135 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1135 may be configured to operate a memory array using a memory controller. In some other cases, a memory controller may be integrated into the processor 1135. The processor 1135 may be configured to execute computer-readable instructions stored in a memory (e.g., the memory 1125) to cause the device 1105 to perform various functions (e.g., functions or tasks supporting cell selection in ES mode cells). For example, the device 1105 or a component of the device 1105 may include a processor 1135 and memory 1125 coupled with the processor 1135, the processor 1135 and memory 1125 configured to perform various functions described herein. The processor 1135 may be an example of a cloud-computing platform (e.g., one or more physical nodes and supporting software such as operating systems, virtual machines, or container instances) that may host the functions (e.g., by executing code 1130) to perform the functions of the device 1105.

In some examples, a bus 1140 may support communications of (e.g., within) a protocol layer of a protocol stack. In some examples, a bus 1140 may support communications associated with a logical channel of a protocol stack (e.g., between protocol layers of a protocol stack), which may include communications performed within a component of the device 1105, or between different components of the device 1105 that may be co-located or located in different locations (e.g., where the device 1105 may refer to a system in which one or more of the communications manager 1120, the transceiver 1110, the memory 1125, the code 1130, and the processor 1135 may be located in one of the different components or divided between different components).

In some examples, the communications manager 1120 may manage aspects of communications with a core network 130 (e.g., via one or more wired or wireless backhaul links). For example, the communications manager 1120 may manage the transfer of data communications for client devices, such as one or more UEs 115. In some examples, the communications manager 1120 may manage communications with other network entities 105, and may include a controller or scheduler for controlling communications with UEs 115 in cooperation with other network entities 105. In some examples, the communications manager 1120 may support an X2 interface within an LTE/LTE-A wireless communications network technology to provide communication between network entities 105.

The communications manager 1120 may support wireless communication at a network entity in accordance with examples as disclosed herein. For example, the communications manager 1120 may be configured as or otherwise support a means for transmitting a discovery signal while operating in an energy-saving mode, where the discovery signal contains less information than a synchronization signal block for use in a cell access procedure. The communications manager 1120 may be configured as or otherwise support a means for receiving, from a UE based on the discovery signal, a trigger signal that indicates a synchronization signal block for use in the cell access procedure is to be transmitted. The communications manager 1120 may be configured as or otherwise support a means for transmitting the synchronization signal block based on the trigger signal.

Additionally, or alternatively, the communications manager 1120 may support wireless communication at a network entity in accordance with examples as disclosed herein. For example, the communications manager 1120 may be configured as or otherwise support a means for transmitting configuration information to a UE for a first type of signaling for use in a cell access procedure for cells operating in a first energy mode and a second type of signaling for use in the cell access procedure for a cell operating in a second energy mode that uses less energy than the first energy mode, where the first type of signaling includes a synchronization signal block transmitted on a first synchronization raster that has associated system information for the cell access procedure, and where the second type of signaling includes one or more of a measurement reference signal, a synchronization signal block transmitted on a different synchronization raster than the first synchronization raster, or a synchronization signal block transmitted without the associated system information. The communications manager 1120 may be configured as or otherwise support a means for receiving, from the UE, an indication of a cell that is operating in the second energy mode as part of the cell access procedure. The communications manager 1120 may be configured as or otherwise support a means for performing the cell access procedure based on the indication from the UE.

By including or configuring the communications manager 1120 in accordance with examples as described herein, the device 1105 may support techniques for operation of network entities in an ES mode and also provide for cell access procedures that are based on signals from ES mode cells and non-ES mode cells. As such, techniques described herein may provide for efficient network operation while also reducing network power consumption. Further, by enabling the UE to trigger SSB transmissions from ES mode cells, cell access may be enhanced and provide cell selection of a suitable cell from cells operating in different modes, which may provide more efficient communications and enhanced overall efficiency and reliability of the wireless communication system.

In some examples, the communications manager 1120 may be configured to perform various operations (e.g., receiving, obtaining, monitoring, outputting, transmitting) using or otherwise in cooperation with the transceiver 1110, the one or more antennas 1115 (e.g., where applicable), or any combination thereof. Although the communications manager 1120 is illustrated as a separate component, in some examples, one or more functions described with reference to the communications manager 1120 may be supported by or performed by the processor 1135, the memory 1125, the code 1130, the transceiver 1110, or any combination thereof. For example, the code 1130 may include instructions executable by the processor 1135 to cause the device 1105 to perform various aspects of cell selection in ES mode cells as described herein, or the processor 1135 and the memory 1125 may be otherwise configured to perform or support such operations.

Figure 12:
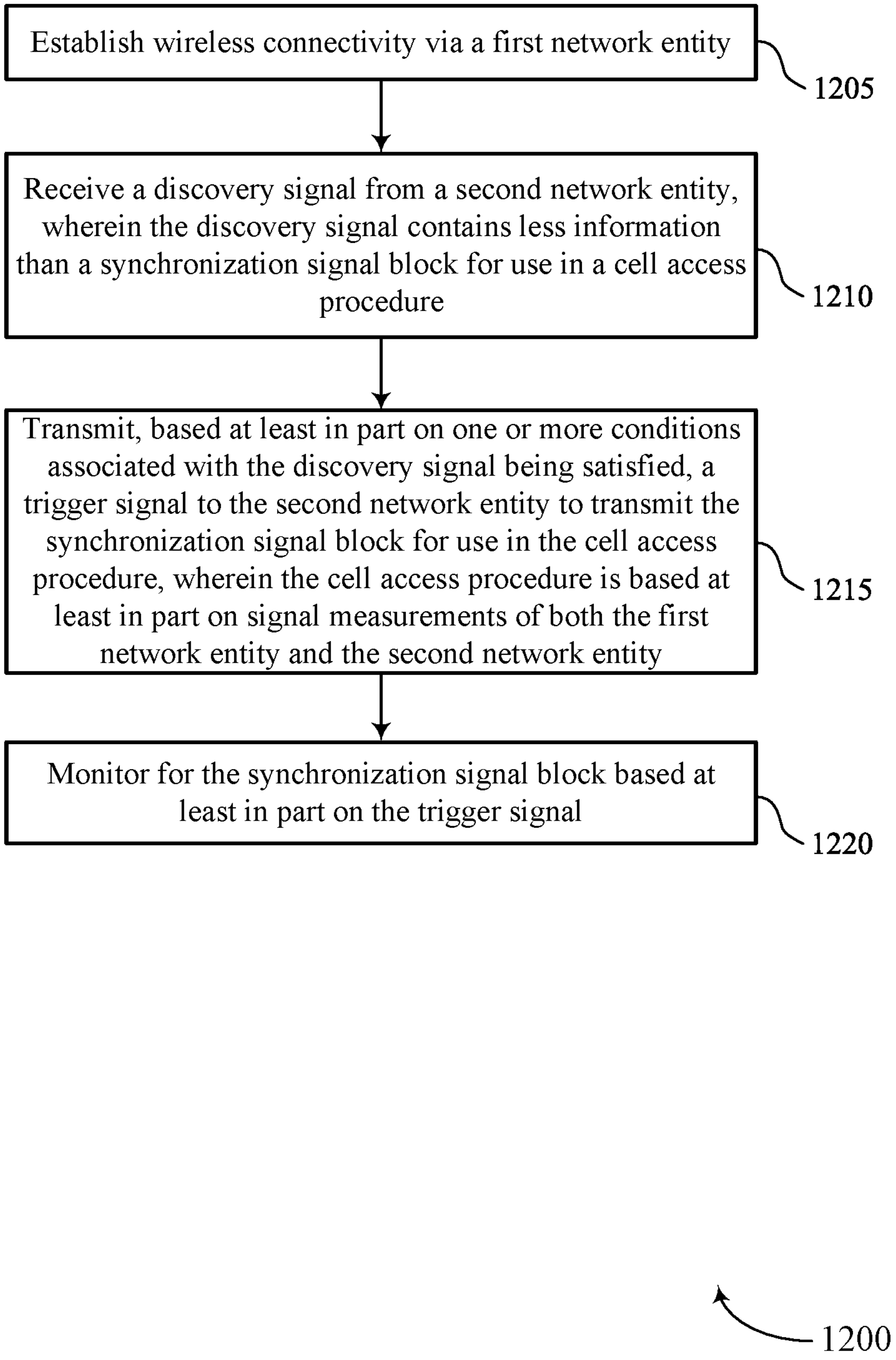
FIGS. 12 through 18 show flowcharts illustrating methods that support cell selection in ES mode cells in accordance with one or more aspects of the present disclosure.

FIG. 12 shows a flowchart illustrating a method 1200 that supports cell selection in ES mode cells in accordance with one or more aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1205, the method may include establishing wireless connectivity via a first network entity. The operations of 1205 may be performed in accordance with examples as disclosed herein. In some examples, aspects of the operations of 1205 may be performed by a cell access manager 635 as described with reference to FIG. 6.

At 1210, the method may include receiving a discovery signal from a second network entity, where the discovery signal contains less information than a synchronization signal block for use in a cell access procedure. The operations of 1210 may be performed in accordance with examples as disclosed herein. In some examples, aspects of the operations of 1210 may be performed by a discovery signal manager 625 as described with reference to FIG. 6.

At 1215, the method may include transmitting, based on one or more conditions associated with the discovery signal being satisfied, a trigger signal to the second network entity to transmit the synchronization signal block for use in the cell access procedure, where the cell access procedure is based at least in part on signal measurements of both the first network entity and the second network entity. The operations of 1215 may be performed in accordance with examples as disclosed herein. In some examples, aspects of the operations of 1215 may be performed by an SSB trigger manager 630 as described with reference to FIG. 6.

At 1220, the method may include monitoring for the synchronization signal block based on the trigger signal. The operations of 1220 may be performed in accordance with examples as disclosed herein. In some examples, aspects of the operations of 1220 may be performed by a cell access manager 635 as described with reference to FIG. 6.

Figure 13:
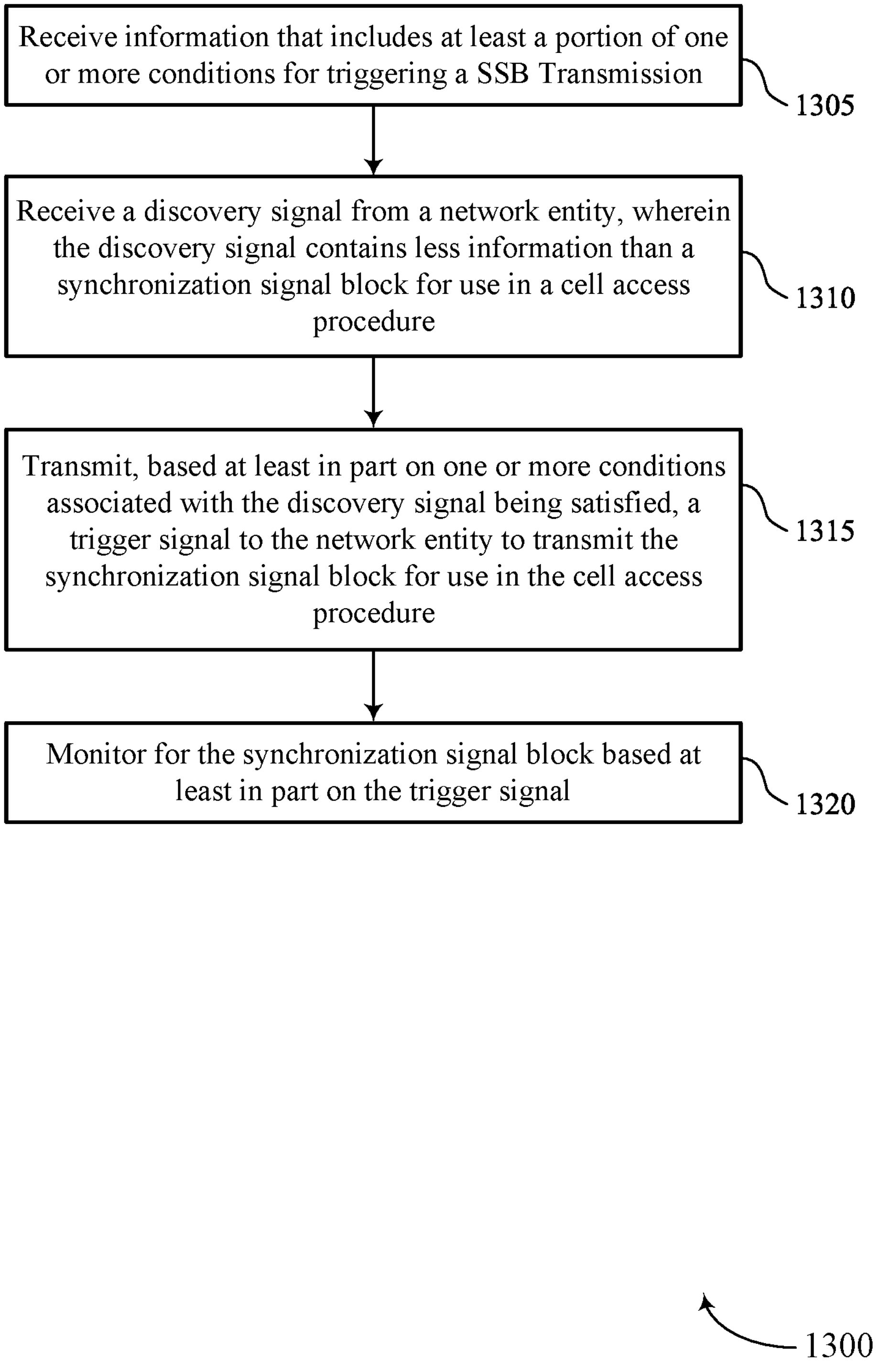

FIG. 13 shows a flowchart illustrating a method 1300 that supports cell selection in ES mode cells in accordance with one or more aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1305, the method may include receiving information that includes at least a portion of one or more conditions for triggering a SSB Transmission. The operations of 1305 may be performed in accordance with examples as disclosed herein. In some examples, aspects of the operations of 1305 may be performed by a configuration manager 645 as described with reference to FIG. 6. In some cases, the information being received in system information, in RRC signaling, in a MAC-CE, or any combinations thereof.

At 1310, the method may include receiving a discovery signal from a network entity, where the discovery signal contains less information than a synchronization signal block for use in a cell access procedure. The operations of 1310 may be performed in accordance with examples as disclosed herein. In some examples, aspects of the operations of 1310 may be performed by a discovery signal manager 625 as described with reference to FIG. 6.

At 1315, the method may include transmitting, based on one or more conditions associated with the discovery signal being satisfied, a trigger signal to the network entity to transmit the synchronization signal block for use in the cell access procedure. The operations of 1315 may be performed in accordance with examples as disclosed herein. In some examples, aspects of the operations of 1315 may be performed by an SSB trigger manager 630 as described with reference to FIG. 6.

At 1320, the method may include monitoring for the synchronization signal block based on the trigger signal. The operations of 1320 may be performed in accordance with examples as disclosed herein. In some examples, aspects of the operations of 1320 may be performed by a cell access manager 635 as described with reference to FIG. 6.

Figure 14:
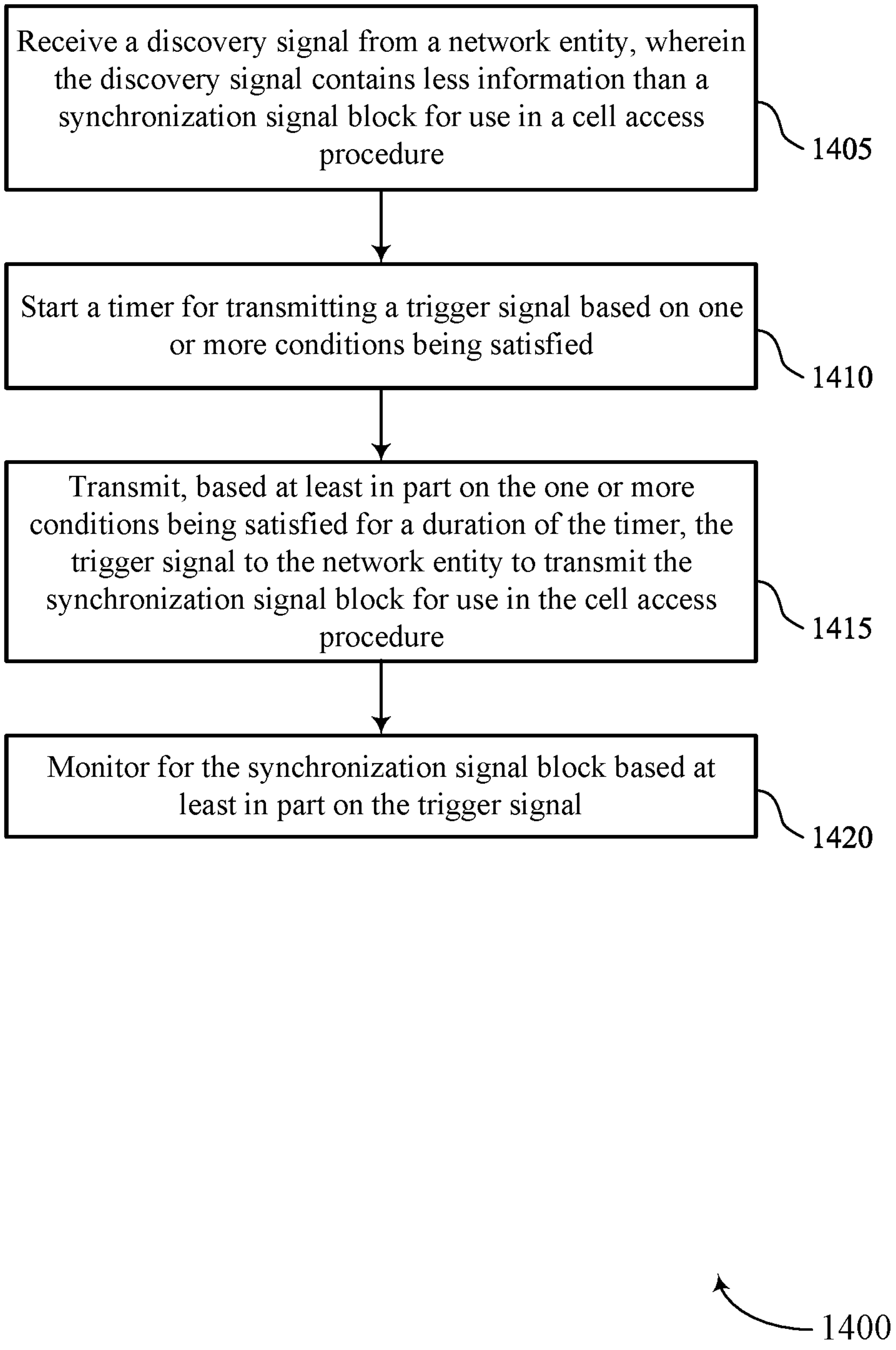

FIG. 14 shows a flowchart illustrating a method 1400 that supports cell selection in ES mode cells in accordance with one or more aspects of the present disclosure. The operations of the method 1400 may be implemented by a UE or its components as described herein. For example, the operations of the method 1400 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1405, the method may include receiving a discovery signal from a network entity, where the discovery signal contains less information than a synchronization signal block for use in a cell access procedure. The operations of 1405 may be performed in accordance with examples as disclosed herein. In some examples, aspects of the operations of 1405 may be performed by a discovery signal manager 625 as described with reference to FIG. 6.

At 1410, the method may include starting a timer for transmitting a trigger signal responsive to one or more conditions being satisfied. The operations of 1410 may be performed in accordance with examples as disclosed herein. In some examples, aspects of the operations of 1410 may be performed by an SSB trigger manager 630 as described with reference to FIG. 6.

At 1415, the method may include transmitting, based at least in part on the one or more conditions being satisfied for a duration of the timer, the trigger signal to the network entity to transmit the synchronization signal block for use in the cell access procedure. The operations of 1415 may be performed in accordance with examples as disclosed herein. In some examples, aspects of the operations of 1415 may be performed by an SSB trigger manager 630 as described with reference to FIG. 6.

At 1420, the method may include monitoring for the synchronization signal block based on the trigger signal. The operations of 1420 may be performed in accordance with examples as disclosed herein. In some examples, aspects of the operations of 1420 may be performed by a cell access manager 635 as described with reference to FIG. 6.

Figure 15:
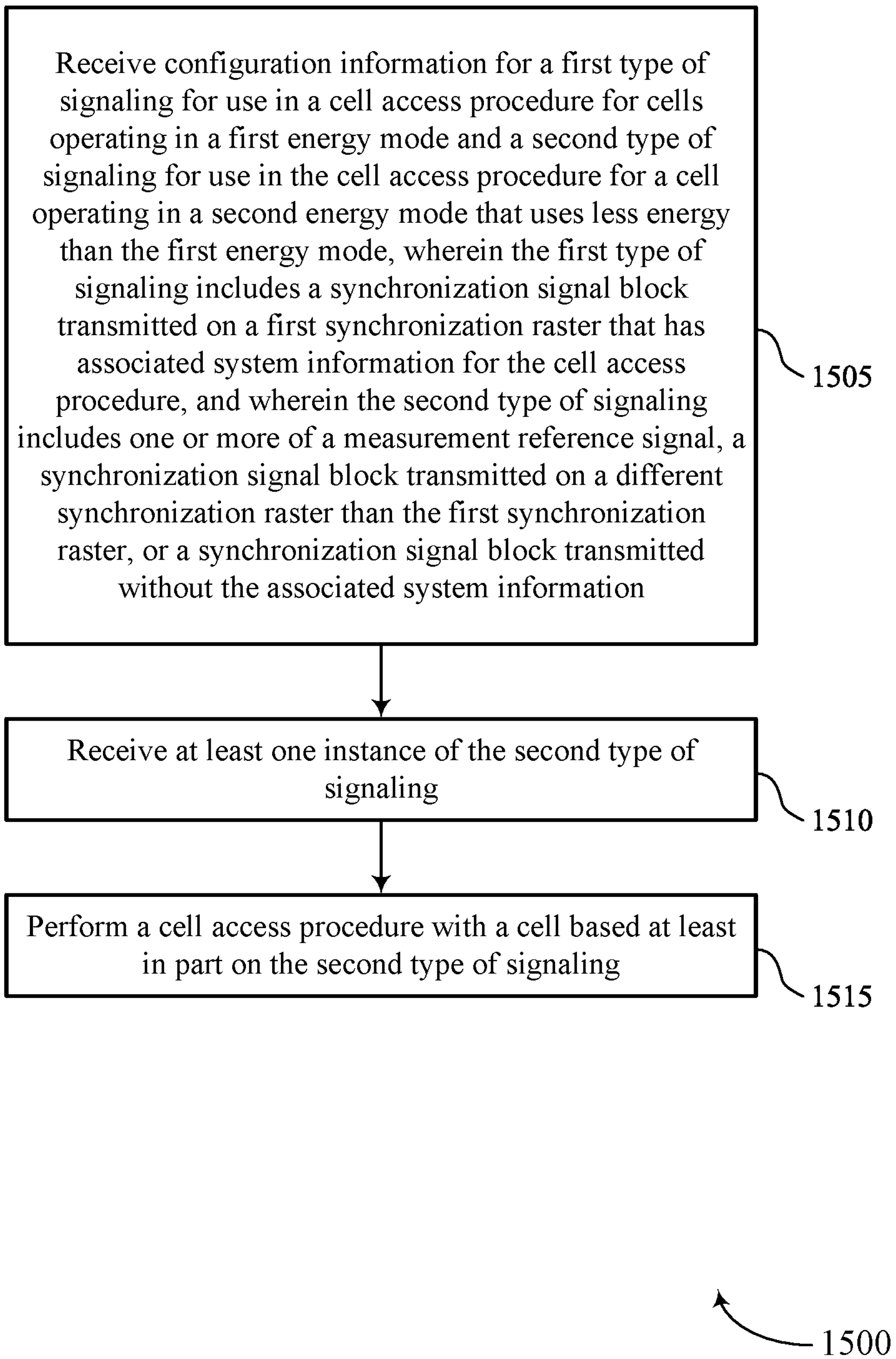

FIG. 15 shows a flowchart illustrating a method 1500 that supports cell selection in ES mode cells in accordance with one or more aspects of the present disclosure. The operations of the method 1500 may be implemented by a UE or its components as described herein. For example, the operations of the method 1500 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1505, the method may include receiving configuration information for a first type of signaling for use in a cell access procedure for cells operating in a first energy mode and a second type of signaling for use in the cell access procedure for a cell operating in a second energy mode that uses less energy than the first energy mode, where the first type of signaling includes a synchronization signal block transmitted on a first synchronization raster that has associated system information for the cell access procedure, and where the second type of signaling includes one or more of a measurement reference signal, a synchronization signal block transmitted on a different synchronization raster than the first synchronization raster, or a synchronization signal block transmitted without the associated system information. The operations of 1505 may be performed in accordance with examples as disclosed herein. In some examples, aspects of the operations of 1505 may be performed by a non-CD-SSB manager 640 as described with reference to FIG. 6.

At 1510, the method may include receiving at least one instance of the second type of signaling. The operations of 1510 may be performed in accordance with examples as disclosed herein. In some examples, aspects of the operations of 1510 may be performed by a non-CD-SSB manager 640 as described with reference to FIG. 6.

At 1515, the method may include performing a cell access procedure with a cell based on the second type of signaling. The operations of 1515 may be performed in accordance with examples as disclosed herein. In some examples, aspects of the operations of 1515 may be performed by a cell access manager 635 as described with reference to FIG. 6.

Figure 16:
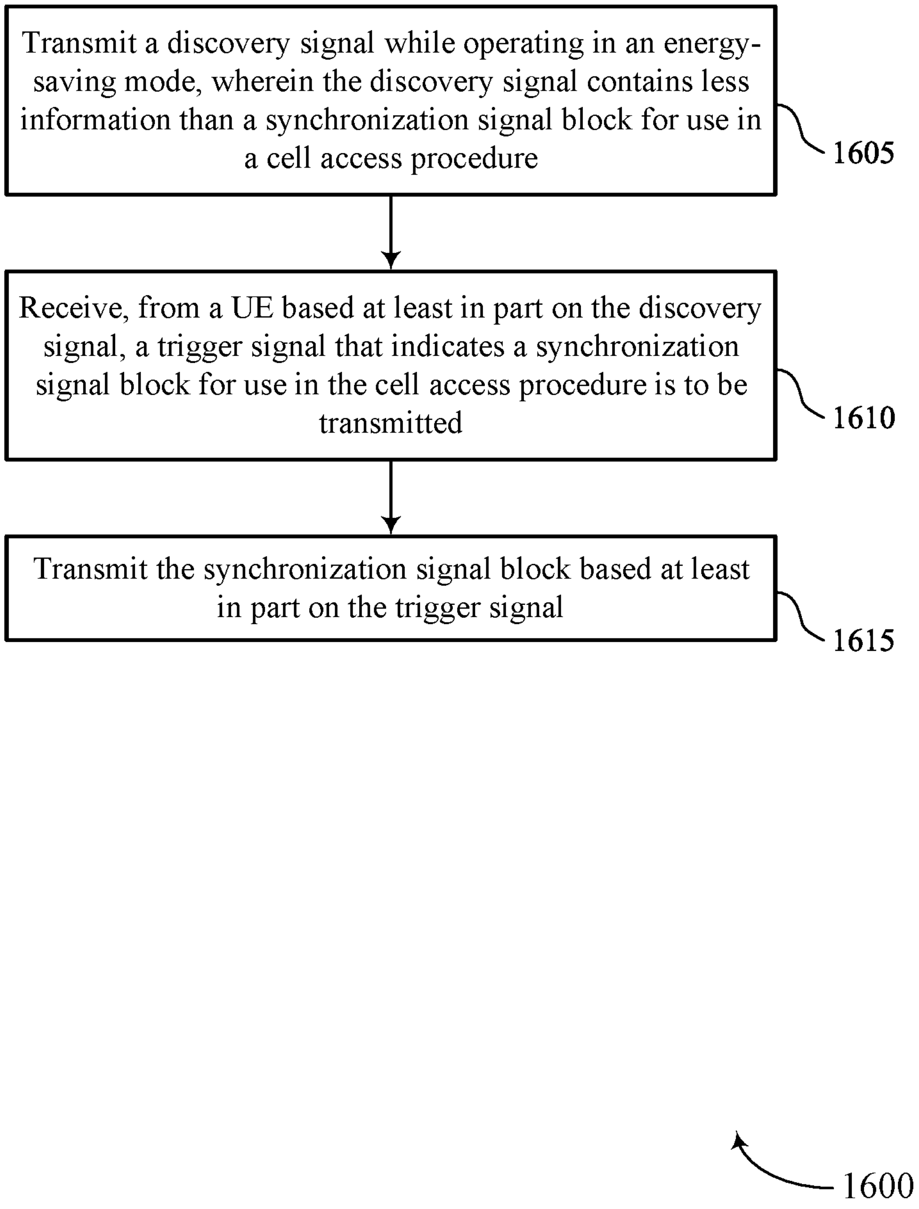

FIG. 16 shows a flowchart illustrating a method 1600 that supports cell selection in ES mode cells in accordance with one or more aspects of the present disclosure. The operations of the method 1600 may be implemented by a network entity or its components as described herein. For example, the operations of the method 1600 may be performed by a network entity as described with reference to FIGS. 1 through 3 and 8 through 11. In some examples, a network entity may execute a set of instructions to control the functional elements of the network entity to perform the described functions. Additionally, or alternatively, the network entity may perform aspects of the described functions using special-purpose hardware.

At 1605, the method may include transmitting a discovery signal while operating in an energy-saving mode, where the discovery signal contains less information than a synchronization signal block for use in a cell access procedure. The operations of 1605 may be performed in accordance with examples as disclosed herein. In some examples, aspects of the operations of 1605 may be performed by a discovery signal manager 1025 as described with reference to FIG. 10.

At 1610, the method may include receiving, from a UE based on the discovery signal, a trigger signal that indicates a synchronization signal block for use in the cell access procedure is to be transmitted. The operations of 1610 may be performed in accordance with examples as disclosed herein. In some examples, aspects of the operations of 1610 may be performed by an SSB trigger manager 1030 as described with reference to FIG. 10.

At 1615, the method may include transmitting the synchronization signal block based on the trigger signal. The operations of 1615 may be performed in accordance with examples as disclosed herein. In some examples, aspects of the operations of 1615 may be performed by a cell access manager 1035 as described with reference to FIG. 10.

Figure 17:
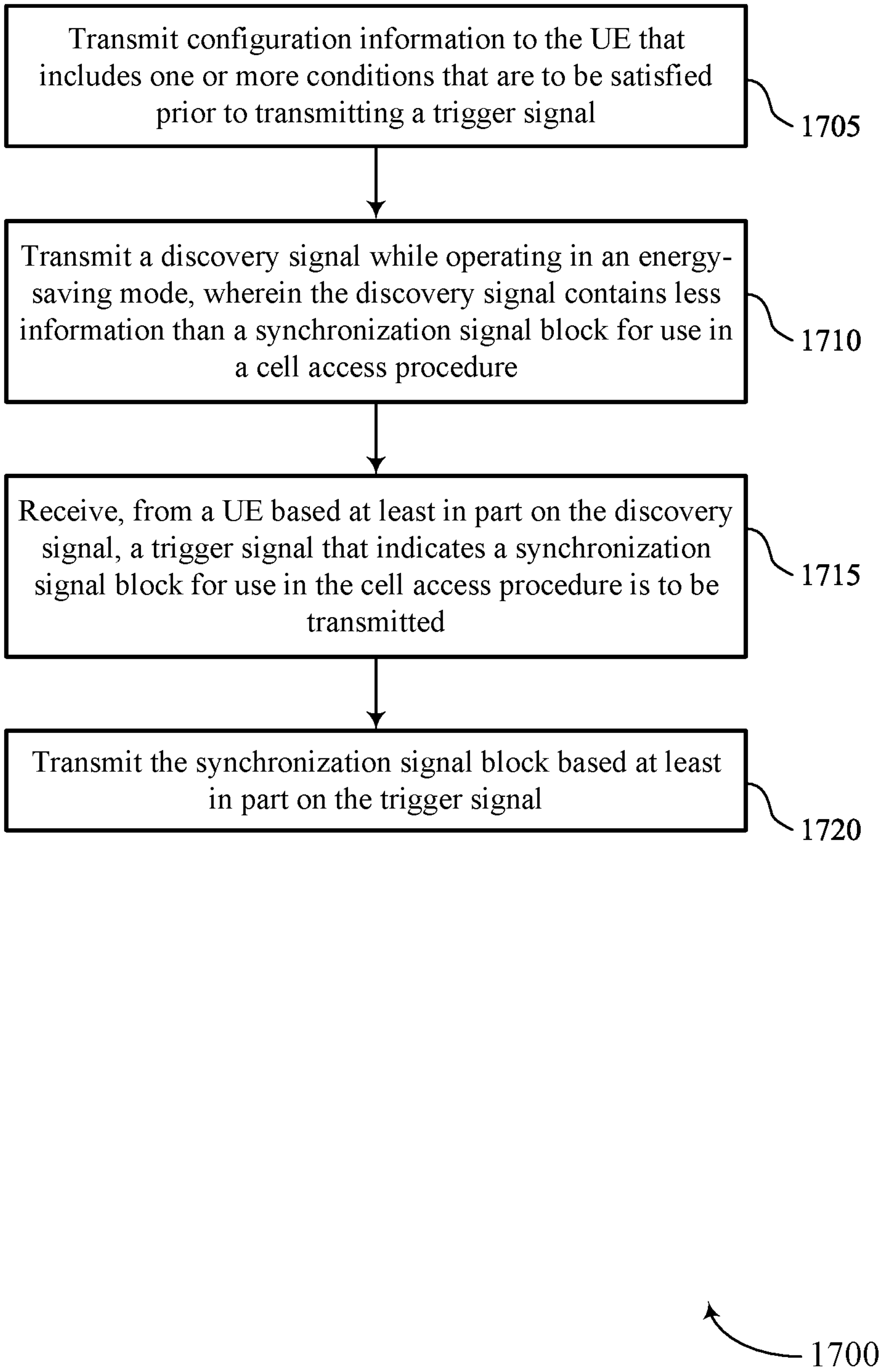

FIG. 17 shows a flowchart illustrating a method 1700 that supports cell selection in ES mode cells in accordance with one or more aspects of the present disclosure. The operations of the method 1700 may be implemented by a network entity or its components as described herein. For example, the operations of the method 1700 may be performed by a network entity as described with reference to FIGS. 1 through 3 and 8 through 11. In some examples, a network entity may execute a set of instructions to control the functional elements of the network entity to perform the described functions. Additionally, or alternatively, the network entity may perform aspects of the described functions using special-purpose hardware.

At 1705, the method may include transmitting configuration information to the UE that includes one or more conditions that are to be satisfied prior to transmitting the trigger signal. The operations of 1705 may be performed in accordance with examples as disclosed herein. In some examples, aspects of the operations of 1705 may be performed by a configuration manager 1045 as described with reference to FIG. 10. In some cases, the configuration information may be transmitted in system information, in RRC signaling, in a MAC-CE, or any combinations thereof.

At 1710, the method may include transmitting a discovery signal while operating in an energy-saving mode, where the discovery signal contains less information than a synchronization signal block for use in a cell access procedure. The operations of 1710 may be performed in accordance with examples as disclosed herein. In some examples, aspects of the operations of 1710 may be performed by a discovery signal manager 1025 as described with reference to FIG. 10.

At 1715, the method may include receiving, from a UE based on the discovery signal, a trigger signal that indicates a synchronization signal block for use in the cell access procedure is to be transmitted. The operations of 1715 may be performed in accordance with examples as disclosed herein. In some examples, aspects of the operations of 1715 may be performed by an SSB trigger manager 1030 as described with reference to FIG. 10.

At 1720, the method may include transmitting the synchronization signal block based on the trigger signal. The operations of 1720 may be performed in accordance with examples as disclosed herein. In some examples, aspects of the operations of 1720 may be performed by a cell access manager 1035 as described with reference to FIG. 10.

Figure 18:
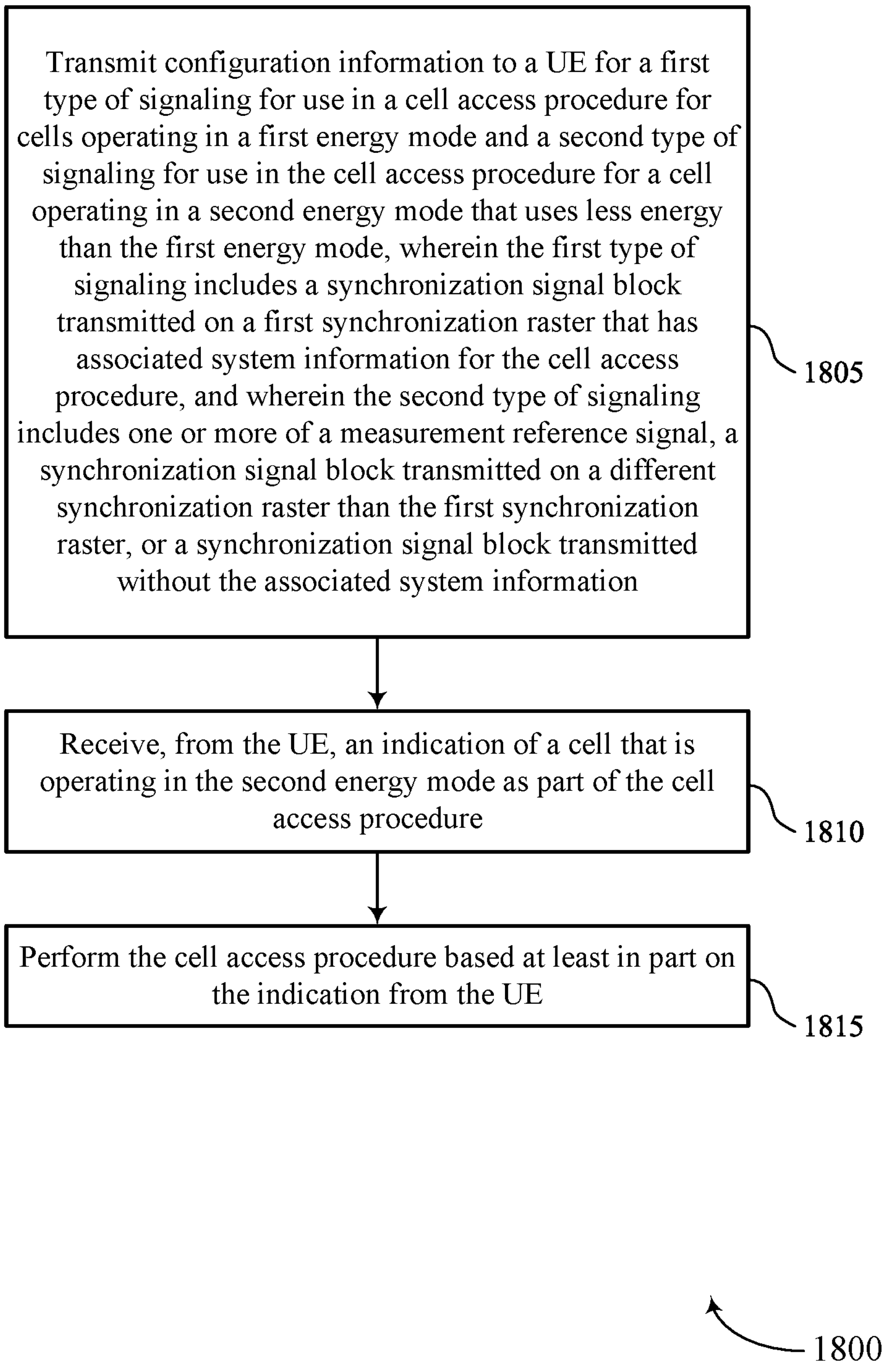

FIG. 18 shows a flowchart illustrating a method 1800 that supports cell selection in ES mode cells in accordance with one or more aspects of the present disclosure. The operations of the method 1800 may be implemented by a network entity or its components as described herein. For example, the operations of the method 1800 may be performed by a network entity as described with reference to FIGS. 1 through 3 and 8 through 11. In some examples, a network entity may execute a set of instructions to control the functional elements of the network entity to perform the described functions. Additionally, or alternatively, the network entity may perform aspects of the described functions using special-purpose hardware.

At 1805, the method may include transmitting configuration information to a UE for a first type of signaling for use in a cell access procedure for cells operating in a first energy mode and a second type of signaling for use in the cell access procedure for a cell operating in a second energy mode that uses less energy than the first energy mode, where the first type of signaling includes a synchronization signal block transmitted on a first synchronization raster that has associated system information for the cell access procedure, and where the second type of signaling includes one or more of a measurement reference signal, a synchronization signal block transmitted on a different synchronization raster than the first synchronization raster, or a synchronization signal block transmitted without the associated system information. The operations of 1805 may be performed in accordance with examples as disclosed herein. In some examples, aspects of the operations of 1805 may be performed by a non-CD-SSB manager 1040 as described with reference to FIG. 10.

At 1810, the method may include receiving, from the UE, an indication of a cell that is operating in the second energy mode as part of the cell access procedure. The operations of 1810 may be performed in accordance with examples as disclosed herein. In some examples, aspects of the operations of 1810 may be performed by a non-CD-SSB manager 1040 as described with reference to FIG. 10.

At 1815, the method may include performing the cell access procedure based on the indication from the UE. The operations of 1815 may be performed in accordance with examples as disclosed herein. In some examples, aspects of the operations of 1815 may be performed by a cell access manager 1035 as described with reference to FIG. 10.

The following provides an overview of aspects of the present disclosure:

Aspect 1: A method for wireless communication at a UE, comprising: establishing wireless connectivity via a first network entity; receiving a discovery signal from a second network entity, wherein the discovery signal contains less information than a SSB for use in a cell access procedure; transmitting, based at least in part on one or more conditions associated with the discovery signal being satisfied, a trigger signal to the second network entity to transmit the SSB for use in the cell access procedure, wherein the cell access procedure is based at least in part on signal measurements of both the first network entity and the second network entity; and monitoring for the SSB based at least in part on the trigger signal.

Aspect 2: The method of aspect 1, wherein the discovery signal is a reference signal that provides less than a full cell identification associated with the second network entity.

Aspect 3: The method aspect 1, wherein the discovery signal is a KAS that provides less than a full cell identification associated with the second network entity.

Aspect 4: The method of any of aspects 1 through 3, wherein the one or more conditions include at least one of whether one or more of a non-blocked frequency is used for transmission of the discovery signal, whether a non-blocked cell is associated with the discovery signal, whether a signal strength of the discovery signal satisfies a first threshold, whether a number of neighbor network entities, that are detected to have a signal strength that satisfies a second threshold and a higher selection priority than the second network entity that transmits discovery signal, satisfies a third threshold, or whether a serving cell signal strength satisfies a fourth threshold.

Aspect 5: The method of any of aspects 1 through 4, wherein the trigger signal initiates a transmission of a CD-SSB from the second network entity.

Aspect 6: The method of any of aspects 1 through 5, further comprising: receiving information that includes at least a portion of the one or more conditions.

Aspect 7: The method of aspect 6, wherein the information is received in system information, in RRC signaling, in a medium access control (MAC) control element, or any combinations thereof.

Aspect 8: The method of any of aspects 1 through 7, wherein at least one of the one or more conditions are defined for triggering the second network entity operating in an energy-saving mode to transmit the SSB for use in the cell access procedure.

Aspect 9: The method of any of aspects 1 through 8, further comprising: starting a timer for transmitting the trigger signal responsive to the one or more conditions being satisfied, and wherein the transmitting the trigger signal is based at least in part on the one or more conditions being satisfied for a duration of the timer.

Aspect 10: The method of any of aspects 1 through 9, wherein the one or more conditions include one or more of whether a signal strength or quality of a serving cell, a signal strength or quality of the discovery signal, or both, satisfies a first threshold, whether a frequency of the discovery signal and a priority associated with the frequency exceeds a priority of a serving cell, whether a signal strength or quality of at least a first neighboring network entity operating on a non-energy-saving mode satisfies a second threshold, whether a signal strength or quality of at least a second neighboring network entity operating on an energy-saving mode satisfies a third threshold, whether a first number of detected network entities operating in the non-energy-saving mode exceeds a second number of detected network entities operating in the energy-saving mode, for two or more different frequencies, whether a barred or reserved channel access status is detected for one or more of the second network entity, the first neighboring network entity, or the second neighboring network entity, or whether one or more thresholds for one or more measured parameters is satisfied for a timer duration associated with the one or more thresholds.

Aspect 11: The method of any of aspects 1 through 10, wherein the one or more conditions are cell-specific conditions for a cell associated with the second network entity, frequency-specific conditions for a frequency associated with the discovery signal, beam-specific conditions for a beam associated with a cell of the second network entity, or any combinations thereof.

Aspect 12: A method for wireless communication at a UE, comprising: receiving configuration information for a first type of signaling for use in a cell access procedure for cells operating in a first energy mode and a second type of signaling for use in the cell access procedure for a cell operating in a second energy mode that uses less energy than the first energy mode, wherein the first type of signaling includes a SSB transmitted on a first synchronization raster that has associated system information for the cell access procedure, and wherein the second type of signaling includes one or more of a measurement reference signal, a SSB transmitted on a different synchronization raster than the first synchronization raster, or a SSB transmitted without the associated system information; receiving at least one instance of the second type of signaling; and performing a cell access procedure with a cell based at least in part on the second type of signaling.

Aspect 13: The method of aspect 12, wherein the first type of signaling provides a CD-SSB transmitted on the first synchronization raster that has an associated RMSI transmission, and the second type of signaling is a non-CD-SSB.

Aspect 14: The method of aspect 13, wherein the second type of signaling is an SSB transmitted on a frequency that is off the first synchronization raster associated with CD-SSBs.

Aspect 15: The method of any of aspects 13 through 14, wherein the second type of signaling is a partial-CD-SSB that has the associated RMSI transmitted in fewer than all instances of SSBs, transmitted on fewer than all beam directions, or transmitted based at least in part on a trigger signal from the UE.

Aspect 16: The method of any of aspects 12 through 15, wherein the second type of signaling is a CSI reference signal.

Aspect 17: The method of any of aspects 12 through 16, wherein the configuration information is provided in a system information block, dedicated signaling, radio resource control signaling, a provisioned list of an operator associated with the UE, or any combinations thereof.

Aspect 18: The method of any of aspects 12 through 17, wherein the second type of signaling is defined for cells operating in the second energy mode.

Aspect 19: A method for wireless communication at a network entity, comprising: transmitting a discovery signal while operating in an energy-saving mode, wherein the discovery signal contains less information than a SSB for use in a cell access procedure; receiving, from a UE based at least in part on the discovery signal, a trigger signal that indicates a SSB for use in the cell access procedure is to be transmitted; and transmitting the SSB based at least in part on the trigger signal.

Aspect 20: The method of aspect 19, wherein the discovery signal is a reference signal provides less than a full cell identification associated with the network entity.

Aspect 21: The method of any of aspects 19 through 20, wherein the discovery signal is a keep alive signal that provides less than a full cell identification associated with the network entity.

Aspect 22: The method of any of aspects 19 through 21, wherein the UE is configured with one or more conditions for transmitting the trigger signal, and wherein the one or more conditions include at least one of: whether one or more of a non-blocked frequency is used for transmission of the discovery signal, whether a non-blocked cell is associated with the discovery signal, whether a signal strength of the discovery signal satisfies a first threshold, whether a number of neighbor network entities, that are detected to have a signal strength that satisfies a second threshold and a higher selection priority than the network entity that transmits discovery signal, satisfies a third threshold, or whether a serving cell signal strength satisfies a fourth threshold.

Aspect 23: The method of any of aspects 19 through 22, wherein the SSB is a CD-SSB transmitted on a defined synchronization raster frequency and having an associated remaining minimum remaining system information transmission.

Aspect 24: The method of any of aspects 19 through 23, further comprising: transmitting configuration information to the UE that includes one or more conditions that are to be satisfied prior to transmitting the trigger signal.

Aspect 25: The method of aspect 24, wherein the configuration information is transmitted in system information, in RRC signaling, in a medium access control (MAC) control element, or any combinations thereof.

Aspect 26: The method of any of aspects 24 through 25, wherein at least one of the one or more conditions are defined for triggering the network entity operating in the energy-saving mode to transmit the SSB for use in the cell access procedure.

Aspect 27: The method of any of aspects 24 through 26, wherein the configuration information includes a timer value associated with the trigger signal, and the trigger signal is transmitted based at least in part on at least one of the one or more conditions being satisfied for a duration of the timer value.

Aspect 28: The method of any of aspects 24 through 27, wherein the one or more conditions include one or more of whether a signal strength or quality of a serving cell, a signal strength or quality of the discovery signal, or both, satisfies a first threshold, whether a frequency of the discovery signal and a priority associated with the frequency exceeds a priority of a serving cell, whether a signal strength or quality of at least a first neighboring network entity operating on a non-energy-saving mode satisfies a second threshold, whether a signal strength or quality of at least a second neighboring network entity operating on the energy-saving mode satisfies a third threshold, whether a first number of detected network entities operating in the non-energy-saving mode exceeds a second number of detected network entities operating in the energy-saving mode, for two or more different frequencies, whether a barred or reserved channel access status is detected for one or more of the network entity, the first neighboring network entity, or the second neighboring network entity, or whether one or more thresholds for one or more measured parameters is satisfied for a timer duration associated with the one or more thresholds.

Aspect 29: The method of any of aspects 24 through 28, wherein the one or more conditions are cell-specific conditions for a cell associated with the network entity, frequency-specific conditions for a frequency associated with the discovery signal, beam-specific conditions for a beam associated with a cell of the network entity, or any combinations thereof.

Aspect 30: A method for wireless communication at a network entity, comprising: transmitting configuration information to a UE for a first type of signaling for use in a cell access procedure for cells operating in a first energy mode and a second type of signaling for use in the cell access procedure for a cell operating in a second energy mode that uses less energy than the first energy mode, wherein the first type of signaling includes a SSB transmitted on a first synchronization raster that has associated system information for the cell access procedure, and wherein the second type of signaling includes one or more of a measurement reference signal, a SSB transmitted on a different synchronization raster than the first synchronization raster, or a SSB transmitted without the associated system information; receiving, from the UE, an indication of a cell that is operating in the second energy mode as part of the cell access procedure; and performing the cell access procedure based at least in part on the indication from the UE.

Aspect 31: The method of aspect 30, wherein the first type of signaling provides a CD-SSB transmitted on the first synchronization raster that has an associated RMSI transmission, and the second type of signaling is a non-CD-SSB.

Aspect 32: The method of aspect 31, wherein the second type of signaling is an SSB transmitted on a frequency that is off the first synchronization raster associated with CD-SSBs.

Aspect 33: The method of any of aspects 31 through 32, wherein the second type of signaling is a partial-CD-SSB that has the associated RMSI transmitted in fewer than all instances of SSBs, transmitted on fewer than all beam directions, or transmitted based at least in part on a trigger signal from the UE.

Aspect 34: The method of any of aspects 30 through 33, wherein the second type of signaling is a CSI reference signal.

Aspect 35: The method of any of aspects 30 through 34, wherein the configuration information is provided in a system information block, dedicated signaling, radio resource control signaling, a provisioned list of an operator associated with the UE, or any combinations thereof.

Aspect 36: The method of any of aspects 30 through 35, wherein the second type of signaling is defined for cells operating in the second energy mode.

Aspect 37: An apparatus for wireless communication at a UE, comprising a processor; memory coupled with the processor; and instructions stored in the memory and executable by the processor to cause the apparatus to perform a method of any of aspects 1 through 11.

Aspect 38: An apparatus for wireless communication at a UE, comprising at least one means for performing a method of any of aspects 1 through 11.

Aspect 39: A non-transitory computer-readable medium storing code for wireless communication at a UE, the code comprising instructions executable by a processor to perform a method of any of aspects 1 through 11.

Aspect 40: An apparatus for wireless communication at a UE, comprising a processor; memory coupled with the processor; and instructions stored in the memory and executable by the processor to cause the apparatus to perform a method of any of aspects 12 through 18.

Aspect 41: An apparatus for wireless communication at a UE, comprising at least one means for performing a method of any of aspects 12 through 18.

Aspect 42: A non-transitory computer-readable medium storing code for wireless communication at a UE, the code comprising instructions executable by a processor to perform a method of any of aspects 12 through 18.

Aspect 43: An apparatus for wireless communication at a network entity, comprising a processor; memory coupled with the processor; and instructions stored in the memory and executable by the processor to cause the apparatus to perform a method of any of aspects 19 through 29.

Aspect 44: An apparatus for wireless communication at a network entity, comprising at least one means for performing a method of any of aspects 19 through 29.

Aspect 45: A non-transitory computer-readable medium storing code for wireless communication at a network entity, the code comprising instructions executable by a processor to perform a method of any of aspects 19 through 29.

Aspect 46: An apparatus for wireless communication at a network entity, comprising a processor; memory coupled with the processor; and instructions stored in the memory and executable by the processor to cause the apparatus to perform a method of any of aspects 30 through 36.

Aspect 47: An apparatus for wireless communication at a network entity, comprising at least one means for performing a method of any of aspects 30 through 36.

Aspect 48: A non-transitory computer-readable medium storing code for wireless communication at a network entity, the code comprising instructions executable by a processor to perform a method of any of aspects 30 through 36.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (wireless local area network (WLAN) technology), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium.

Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE) for wireless communication, comprising:
- one or more processors;
- one or more memories coupled with the one or more processors; and
- instructions stored in the one or more memories and executable by the one or more processors to cause the UE to:
  - establish wireless connectivity via a first network entity;
  - wirelessly receive a discovery signal from a second network entity, wherein the discovery signal contains less information than a synchronization signal block for use in a cell access procedure;
  - wirelessly transmit, based at least in part on one or more conditions associated with the discovery signal being satisfied, a trigger signal to the second network entity to transmit the synchronization signal block for use in the cell access procedure, wherein the cell access procedure is based at least in part on signal measurements of both the first network entity and the second network entity; and
  - monitor for the synchronization signal block based at least in part on the trigger signal.

2. The UE of claim 1, wherein the discovery signal is a reference signal that provides less than a full cell identification associated with the second network entity.

3. The UE of claim 1, wherein the discovery signal is a keep alive signal that provides less than a full cell identification associated with the second network entity.

4. The UE of claim 1, wherein:
- the one or more conditions include at least one of:
  - whether one or more of a non-blocked frequency is used for transmission of the discovery signal,
  - whether a non-blocked cell is associated with the discovery signal,
  - whether a signal strength of the discovery signal satisfies a first threshold,
  - whether a number of neighbor network entities, that are detected to have a signal strength that satisfies a second threshold and a higher selection priority than the second network entity that transmits discovery signal, satisfies a third threshold, or
  - whether a serving cell signal strength satisfies a fourth threshold.

5. The UE of claim 1, wherein the trigger signal initiates a transmission of a cell-defining synchronization signal block from the second network entity.

6. The UE of claim 1, wherein the instructions are further executable by the one or more processors to cause the UE to:
- wirelessly receive information that includes at least a portion of the one or more conditions.

7. The UE of claim 6, wherein the information is received in system information, in radio resource control (RRC) signaling, in a medium access control (MAC) control element, or any combinations thereof.

8. The UE of claim 1, wherein at least one of the one or more conditions are defined for triggering the second network entity operating in an energy-saving mode to transmit the synchronization signal block for use in the cell access procedure.

9. The UE of claim 1, wherein the instructions are further executable by the one or more processors to cause the UE to:
- start a timer for transmitting the trigger signal responsive to the one or more conditions being satisfied, and wherein the trigger signal is transmitted based at least in part on the one or more conditions being satisfied for a duration of the timer.

10. The UE of claim 1, wherein the one or more conditions include one or more of:

whether a signal strength or quality of a serving cell, a signal strength or quality of the discovery signal, or both, satisfies a first threshold, whether a frequency of the discovery signal and a priority associate with the frequency exceeds a priority of a serving cell, whether a signal strength or quality of at least a first neighboring network entity operate on a non-energy-saving mode satisfies a second threshold, whether a signal strength or quality of at least a second neighboring network entity operate on an energy-saving mode satisfies a third threshold, whether a first number of detected network entities operating in the non-energy-saving mode exceeds a second number of detected network entities operating in the energy-saving mode, for two or more different frequencies, whether a barred or reserved channel access status is detected for one or more of the second network entity, the first neighboring network entity, or the second neighboring network entity, or whether one or more thresholds for one or more measured parameters are satisfied for a timer duration associated with the one or more thresholds.

11. The UE of claim 1, wherein the one or more conditions are cell-specific conditions for a cell associated with the second network entity, frequency-specific conditions for a frequency associated with the discovery signal, beam-specific conditions for a beam associated with a cell of the second network entity, or any combinations thereof.

12. A method for wireless communication at a user equipment (UE), comprising:

establishing wireless connectivity via a first network entity;

wirelessly receiving a discovery signal from a second network entity, wherein the discovery signal contains less information than a synchronization signal block for use in a cell access procedure;

wirelessly transmitting, based at least in part on one or more conditions associated with the discovery signal being satisfied, a trigger signal to the second network entity to transmit the synchronization signal block for use in the cell access procedure, wherein the cell access procedure is based at least in part on signal measurements of both the first network entity and the second network entity; and monitoring for the synchronization signal block based at least in part on the trigger signal.

13. The method of claim 12, wherein the discovery signal is a reference signal that provides less than a full cell identification associated with the second network entity.

14. The method of claim 12, wherein the discovery signal is a keep alive signal that provides less than a full cell identification associated with the second network entity.

15. The method of claim 12, wherein the one or more conditions include at least one of:

whether one or more of a non-blocked frequency is used for transmission of the discovery signal, whether a non-blocked cell is associated with the discovery signal, whether a signal strength of the discovery signal satisfies a first threshold, whether a number of neighbor network entities, that are detected to have a signal strength that satisfies a second threshold and a higher selection priority than the second network entity that transmits discovery signal, satisfies a third threshold, or whether a serving cell signal strength satisfies a fourth threshold.

16. The method of claim 12, wherein the trigger signal initiates a transmission of a cell-defining synchronization signal block from the second network entity.

17. The method of claim 12, further comprising:

wirelessly receiving information that includes at least a portion of the one or more conditions.

18. The method of claim 17, wherein the information is received in system information, in radio resource control (RRC) signaling, in a medium access control (MAC) control element, or any combinations thereof.

19. The method of claim 12, wherein at least one of the one or more conditions are defined for triggering the second network entity operating in an energy-saving mode to transmit the synchronization signal block for use in the cell access procedure.

20. The method of claim 12, further comprising:

starting a timer for transmitting the trigger signal responsive to the one or more conditions being satisfied, and wherein the trigger signal is transmitted based at least in part on the one or more conditions being satisfied for a duration of the timer.

21. The method of claim 12, wherein the one or more conditions include one or more of:

whether a signal strength or quality of a serving cell, a signal strength or quality of the discovery signal, or both, satisfies a first threshold, whether a frequency of the discovery signal and a priority associate with the frequency exceeds a priority of a serving cell, whether a signal strength or quality of at least a first neighboring network entity operate on a non-energy-saving mode satisfies a second threshold, whether a signal strength or quality of at least a second neighboring network entity operate on an energy-saving mode satisfies a third threshold, whether a first number of detected network entities operating in the non-energy-saving mode exceeds a second number of detected network entities operating in the energy-saving mode, for two or more different frequencies, whether a barred or reserved channel access status is detected for one or more of the second network entity, the first neighboring network entity, or the second neighboring network entity, or whether one or more thresholds for one or more measured parameters are satisfied for a timer duration associated with the one or more thresholds.

22. The method of claim 12, wherein the one or more conditions are cell-specific conditions for a cell associated with the second network entity, frequency-specific conditions for a frequency associated with the discovery signal, beam-specific conditions for a beam associated with a cell of the second network entity, or any combinations thereof.

23. A user equipment (UE) for wireless communication, comprising:

means for establishing wireless connectivity via a first network entity;

means for wirelessly receiving a discovery signal from a second network entity, wherein the discovery signal contains less information than a synchronization signal block for use in a cell access procedure;

means for wirelessly transmitting, based at least in part on one or more conditions associated with the discovery signal being satisfied, a trigger signal to the second network entity to transmit the synchronization signal block for use in the cell access procedure, wherein the cell access procedure is based at least in part on signal measurements of both the first network entity and the second network entity; and means for monitoring for the synchronization signal block based at least in part on the trigger signal.

24. The UE of claim 23, wherein the discovery signal is a reference signal that provides less than a full cell identification associated with the second network entity.

25. The UE of claim 23, wherein the discovery signal is a keep alive signal that provides less than a full cell identification associated with the second network entity.

26. The UE of claim 23, wherein:

the one or more conditions include at least one of:

whether one or more of a non-blocked frequency is used for transmission of the discovery signal, whether a non-blocked cell is associated with the discovery signal, whether a signal strength of the discovery signal satisfies a first threshold, whether a number of neighbor network entities, that are detected to have a signal strength that satisfies a second threshold and a higher selection priority than the second network entity that transmits discovery signal, satisfies a third threshold, or whether a serving cell signal strength satisfies a fourth threshold.

27. The UE of claim 23, wherein the trigger signal initiates a transmission of a cell-defining synchronization signal block from the second network entity.

28. The UE of claim 23, further comprising:

means for wirelessly receiving information that includes at least a portion of the one or more conditions.

29. The UE of claim 28, wherein the information is received in system information, in radio resource control (RRC) signaling, in a medium access control (MAC) control element, or any combinations thereof.

30. A non-transitory computer-readable medium storing code for wireless communication, the code comprising instructions executable by one or more processors to:

establish wireless connectivity via a first network entity;

wirelessly receive a discovery signal from a second network entity, wherein the discovery signal contains less information than a synchronization signal block for use in a cell access procedure;

wirelessly transmit, based at least in part on one or more conditions associated with the discovery signal being satisfied, a trigger signal to the second network entity to transmit the synchronization signal block for use in the cell access procedure, wherein the cell access procedure is based at least in part on signal measurements of both the first network entity and the second network entity; and monitor for the synchronization signal block based at least in part on the trigger signal.

* * * * *